United States Patent
Connors et al.

(10) Patent No.: US 10,565,641 B2
(45) Date of Patent: Feb. 18, 2020

(54) FINANCIAL GADGETS

(71) Applicant: Yodlee, Inc., Redwood City, CA (US)

(72) Inventors: Eric Connors, Pleasanton, CA (US); Jordan Reed, Palo Alto, CA (US); Peter Hazlehurst, Foster City, CA (US); Suman Sarkar, Sunnyvale, CA (US)

(73) Assignee: Yodlee, Inc., Redwood City, CA (US)

( * ) Notice: Subject to any disclaimer, the term of this patent is extended or adjusted under 35 U.S.C. 154(b) by 760 days.

(21) Appl. No.: 13/720,215

(22) Filed: Dec. 19, 2012

(65) Prior Publication Data

US 2013/0204778 A1 Aug. 8, 2013

Related U.S. Application Data

(63) Continuation of application No. 12/624,349, filed on Nov. 23, 2009, now Pat. No. 8,346,615.

(Continued)

(51) Int. Cl.
*G06Q 40/02* (2012.01)
*G06F 21/62* (2013.01)
(Continued)

(52) U.S. Cl.
CPC .................................. *G06Q 40/00* (2013.01)

(58) Field of Classification Search
CPC ........ G06Q 40/02; G06Q 40/00; G06F 12/14; G06F 17/00; G06F 3/00; G06F 3/0481;
(Continued)

(56) References Cited

U.S. PATENT DOCUMENTS 6,199,007 B1   3/2001 Zavarehi et al.
6,278,993 B1   8/2001 Kumar et al.
(Continued)

FOREIGN PATENT DOCUMENTS

KR   10-2000-0058005   9/2000
KR   10-2001-0107728   12/2001

OTHER PUBLICATIONS

Authorized Officer Jae Gwi Choi, Korean Intellectual Property Office, International Search Report dated Jun. 16, 2011 for Application No. PCT/US2009/065738, filed Nov. 24, 2009.

(Continued)

*Primary Examiner* — Clifford B Madamba
(74) *Attorney, Agent, or Firm* — Fish & Richardson P.C.

(57) ABSTRACT

Methods, computer program products, and systems, related to providing financial gadgets to users. In one implementation, a method includes receiving gadgets and receiving a notification that one or more gadgets has been certified. A web page with an interface through which users can select gadgets is generated and provided to a user computer. A user selects a gadget, and the selected gadget is run, including providing the user-specific financial information to the gadget. Content based on the output of the gadget is provided to the user. User-specific financial information can be collected, and modified by the gadget. A notification can be received that a financial institution has authorized one or more of the certified gadgets and the web page can only allow users to select authorized gadgets.

13 Claims, 16 Drawing Sheets

Related U.S. Application Data

(60) Provisional application No. 61/117,868, filed on Nov. 25, 2008.

(51) Int. Cl.
  *G06F 21/55* (2013.01)
  *G06F 3/0481* (2013.01)
  *G06Q 40/00* (2012.01)

(58) Field of Classification Search
  CPC . G06F 3/04817; G06F 21/552; G06F 21/6218
  USPC .......................................................... 705/39
  See application file for complete search history.

(56) References Cited

U.S. PATENT DOCUMENTS

| | | | |
|---|---|---|---|
| 6,567,850 B1 | 5/2003 | Freishtat et al. | |
| 6,871,220 B1 | 3/2005 | Rajan et al. | |
| 7,200,804 B1 | 4/2007 | Khavari et al. | |
| 7,472,342 B2 | 12/2008 | Haut et al. | |
| 7,743,336 B2* | 6/2010 | Louch .................. | G06F 21/552 715/766 |
| 7,954,064 B2 | 5/2011 | Forstall et al. | |
| 8,326,769 B1 | 12/2012 | Weisman | |
| 8,621,215 B1 | 12/2013 | Iyer | |
| 2003/0018910 A1* | 1/2003 | Wert .................. | G06F 21/6218 726/27 |
| 2004/0171374 A1 | 9/2004 | Little et al. | |
| 2005/0108647 A1 | 5/2005 | Musson et al. | |
| 2006/0179117 A1 | 8/2006 | Anderson et al. | |
| 2007/0101297 A1* | 5/2007 | Forstall .............. | G06F 3/04817 715/841 |
| 2007/0130347 A1 | 6/2007 | Rangan et al. | |
| 2007/0180380 A1 | 8/2007 | Khavari et al. | |
| 2007/0265954 A1 | 11/2007 | Mather et al. | |
| 2008/0046349 A1* | 2/2008 | Elberg et al. .................. | 705/35 |
| 2008/0097906 A1* | 4/2008 | Williams et al. ............... | 705/44 |
| 2008/0235123 A1 | 9/2008 | Olliphant et al. | |
| 2008/0255962 A1 | 10/2008 | Chang et al. | |
| 2009/0070426 A1 | 3/2009 | McCauley et al. | |
| 2009/0100377 A1 | 4/2009 | Miyamoto et al. | |
| 2009/0158193 A1 | 6/2009 | Chaudhri et al. | |
| 2009/0249282 A1 | 10/2009 | Meijer et al. | |
| 2009/0276368 A1 | 11/2009 | Martin et al. | |
| 2009/0313601 A1 | 12/2009 | Baird et al. | |
| 2010/0017385 A1 | 1/2010 | Wilcox et al. | |
| 2010/0023874 A1 | 1/2010 | Frohwein | |
| 2010/0058333 A1 | 3/2010 | Peterson | |
| 2010/0138316 A1 | 6/2010 | Connors et al. | |
| 2010/0250430 A1 | 9/2010 | Ariff et al. | |
| 2011/0251949 A1 | 10/2011 | Kay et al. | |
| 2012/0254002 A1* | 10/2012 | Kundagrami .......... | G06Q 40/02 705/35 |

OTHER PUBLICATIONS

Authorized Officer A. Nickitas-Etienne, International Preliminary Report on Patentability in International Application No. PCT/US2009/065738, dated Jun. 21, 2011, 7 pages.
App Store (iOS), Wikipedia, http://en.wikipedia.org/wiki/App_Store_iOS); Aug. 18, 2011, 8 pages.
Adding Yahoo! Applications, http://help.yahoo.com/tutorials/my2/mycham/my_openapps1.html; Aug. 18, 2011, 3 pgs.
European Patent Office, European Search Report, Application No. 09796872.1, dated May 30, 2012 (dated Jun. 12, 2012), 5 pages.
Official Journal EPO, Nov. 2007, "Notice from the European Patent Office dated Oct. 1, 2007 concerning business methods," pp. 592-593.
New Zealand Office Action received for Application No. 593067, dated Sep. 4, 2012 (3 pages).
Perez, "First iGoogle Banking Gadget Released by Fidelity," 2008, Retrieved from http://www.readwriteweb.com/archives/firstigooglebankinggdgetby_fidelity.php.
Xu Ming Chen et al., "Next-generation banking with Web 2.0," IBM®, 2009.
Christian Kaar, "An Introduction to Widgets with particular emphasis on Mobile Widgets," University of Applied Sciences, Hagenberg, Technical Report No. 06/1/0455/009/02, Oct. 2007.
*Google+*. Wikipedia.com. Last updated Oct. 23, 2014. Retrieved from the internet on Nov. 4, 2014. Retrieved from the internet: URL<http://en.wikipedia.org/wiki/Google%2B>. 21 pages.
*Google+*. Google. Last updated on Sep. 12, 2013. Retrieved from the internet on Nov. 4, 2014. Retrieved from the internet: URL<http://www.google.com/+/learnmore/circles/>. 3 pages.
*Account Aggregation*. Wikipedia.com. Last updated Apr. 24, 2014. Retrieved from the internet on Nov. 4, 2014. Retrieved from the internet: URL<http://en.wikipedia.org/wiki/Account_aggregation>. 2 pages.
*Splitwise*. Splitwise. Last updated Nov. 4, 2014. Retrieved from the internet on Nov. 4, 2014. Retrieved from the internet: URL<https://www.splitwise.com/>. 2 pages.
*Splitwise*. Google Play. Last updated Oct. 15, 2014. Retrieved from the internet on Nov. 4, 2014. Retrieved from the internet: URL<https://play.google.com/store/apps/details?id=com.Splitwise.SplitwiseMobile>. 2 pages.
*Splitabill*. Splitabill. Last updated Nov. 4, 2014. Retrieved from the internet on Nov. 4, 2014. Retrieved from the internet: URL<https://splitabill.com/tour/>. 2 pages.
*Splitabill*. iTunes Preview. Last updated Oct. 15, 2012. Retrieved from the internet on Nov. 4, 2014. Retrieved from the internet: URL<https://itunes.apple.com/us/app/splitabill/id485048203>. 2 pages.
*Billr*. Billr. Last updated Oct. 16, 2013. Retrieved from the internet on Nov. 4, 2014. Retrieved from the internet: URL<http://billr.me/>. 4 pages.
*Billr*. iTunes Preview. Last updated Nov. 3, 2012. Retrieved from the internet on Nov. 4, 2014. Retrieved from the internet: URL<https://itunes.apple.com/us/app/billr-bill-splitting-at-table/id501889312?ls=1&mt=8>. 2 pages.
*Divvy That Up*. Divvy That Up. Last updated Sep. 17, 2013. Retrieved from the internet on Nov. 4, 2014. Retrieved from the internet: URL<http://www.divvythatup.com/>. 5 pages.
*Divvy*. iTunes. Last updated Sep. 26, 2013. Retrieved from the internet on Nov. 4, 2014. Retrieved from the internet: URL<https://itunes.apple.com/us/app/divvy/id560503890?ls=1&mt=8>. 2 pages.
*DapShare*. dapShare. Last updated Nov. 4, 2014. Retrieved from the internet on Nov. 4, 2014. Retrieved from the internet: URL<http://dapshare.com/>. 2 pages.
*DapShare*. Google Play. Last updated Nov. 23, 2011. Retrieved from the internet on Nov. 4, 2014. Retrieved from the internet: URL<https://play.google.com/store/apps/details?id=com.dapshare&hl=en>. 2 pages.
*WeSplit.It*. WeSplit.It. Last updated Nov. 4, 2014. Retrieved from the internet on Nov. 4, 2014. Retrieved from the internet: URL<https://wesplit.it/>. 2 pages.
*Spot Me*. Spot Me. Last updated Nov. 4, 2014. Retrieved from the internet on Nov. 4, 2014. Retrieved from the internet: URL<http://www.getspotme.com/>. 2 pages.
*Spot Me*. iTunes. Last updated Dec. 19, 2012. Retrieved from the internet on Nov. 4, 2014. Retrieved from the internet: URL<https://itunes.apple.com/us/app/spotme-payments/id443369076?mt=8&ls=1>. 4 pages.
*Divide.It*. Divide.It. Last updated Nov. 4, 2014. Retrieved from the internet on Nov. 4, 2014. Retrieved from the internet: URL<http://divide.it/tour>. 1 page.
Office Action received in Canadian Patent Application No. 2744547, filed May 24, 2011. 6 pages.
Office Action received in Australian Patent Application No. 2009324949, filed May 24, 2011. 3 pages.

* cited by examiner

YODLEE 517  515

| Yodlee Personal Finance | Yodlee Bill Pay | Yodlee Funds Transfer | Yodlee Financial Calendar | Yodlee Customer Care | Dashboard |

Forum | Messages | Customize | Submit Service Request | Printable View | Help | Log Out
Tuesday, October 7 - 11:16 PM PDT  501

8 New Gadgets Available Now!  511

Change View: ▫▫▫ ▫▫ ▫▫

Map My Dollars

503

Mortgage Calculator 513

- Loan Amount: 200000
- Years: 30
- Interest Rate: 6.0
- Annual Taxes: 5000
- Annual Insurance: 500
- [Calculate]
- Monthly Payment =
- Money-saving tips

505

Live Quotes

| SYMBOL | BID | ASK | HIGH |
| --- | --- | --- | --- |
| EUR/USD | 1.3586 | 1.3589 | 1.3688 |
| GBP/USD | 1.7531 | 1.7536 | 1.7604 |
| USD/JPY | 101.31 | 101.34 | 102.27 |
| USD/CHF | 1.1329 | 1.1333 | 1.1408 |
| USD/CAD | 1.1744 | 1.1749 | 1.1753 |
| AUD/USD | 0.6907 | 0.6911 | 0.7078 |

507

Click to verify powered by YODLEE

Privacy Policy | Security Policy | Disclaimer | Yodlee Support

FIG. 5

YODLEE

Forum | Messages | Customize | Submit Service Request | Printable View | Help | Log Out Tuesday, October 7 - 11:16 PM PDT Yodlee Personal Finance | Yodlee Bill Pay | Yodlee Funds Transfer | Yodlee Financial Calendar | Yodlee Customer Care | Dashboard

Change View: ▣▣▣ ▣▣ ▣▣

8 New Gadgets Available Now!

Map My Dollars — 603

Live Quotes

| SYMBOL | BID | ASK | HIGH | LOW | CHANGE |
|---|---|---|---|---|---|
| EUR/USD | 1.3825 | 1.3628 | 1.3888 | 1.3534 | — |
| GBP/USD | 1.7573 | 1.7578 | 1.7604 | 1.7378 | — |
| USD/JPY | 101.44 | 101.47 | 102.27 | 100.85 | — |
| USD/CHF | 1.1302 | 1.1308 | 1.1408 | 1.1288 | — |
| USD/CAD | 1.1760 | 1.1785 | 1.1778 | 1.1585 | — |
| AUD/USD | 0.6830 | 0.8834 | 0.7078 | 0.8872 | — |

— 607

609

Mortgage Calculator — 605

Loan Amount: 200000
Years: 30
Interest Rate: 6.0
Annual Taxes: 5000
Annual Insurance: 500

[Calculate]

Monthly Payment =

Privacy Policy | Security Policy | Disclaimer | Yodlee Support

Click to verify

YODLEE.COM
GADGETS

Gadget Developer? Make Moolah!
*SELL YOUR GADGETS AT THE GADGET MART*

Welcome, FirstName | MoneyCenter Dashboard
Logout

| Enter search terms 🔍 |
|---|
| Most Popular |
| Recent Additions |
| See the Complete List |
| Categories |
| Expense Trackers |
| Charting Gizmos |
| Calculators |
| Reminders and Alerts |

801  803  807
MapMyDollars by BillSter
A simple-to-use Financial Calculator add-on which adds Mortgage Calculator, Retirement Planner, Gift-Scheduler and many more features to your MoneyCenter Account.

805

[map image] — 811

809  $10$^{23}$ only 821  5458 👍 27
823 👎
827 BuyNow

MapMyDollars Features:
1. A complete map application for your transactions
2. Ability to chronologically map all your transactions exactly as they happened
3. Learn Mode - Finds easier, simpler, shorter paths to similar purchase paths
4. See actually 'where' that money was spent on the map, and mark a flag

813

More from this Author:
1. e Bay Scanner
2. SocialMoney
3. CreditMonger
4. Auto Balance Transfer

815

Comments:
Mitch said:
This is one slick gadget! It's weird in the beginning to see where you spent your money. But then, it helped me to watch how my routes could've been in a way that I saved a hell lot of gas. I could look see patterns. I found out that I usually spent more around my Fridays, which always made me overspend on my weekends. I can now observe my routes, and change the way I travel. So, if I don't go over the Beer Joint on Friday, I don't spend all that much! Thanks for MapMy Dollars, it's a sooper help! Totally worth the money. Hightly Recommended!

817

Add a Comment!
819

YODLEE.COM
GADGETS

Gadget Developer? Make Moolah!
*SELL YOUR GADGETS AT THE GADGET MART*

Welcome, FirstName | MoneyCenter Dashboard
Logout

[Enter search terms] 🔍

Most Popular

Recent Additions

See the Complete List

Categories

Expense Trackers

Charting Gizmos

Calculators

Reminders and Alerts

— 901

— 903

MapMyDollars by BillSter  — 907

A simple-to-use Financial Calculator add-on which adds Mortgage Calculator, Retirement Planner, Gift-Scheduler and many more features to your MoneyCenter Account.  — 905

$10$^{23}$ only — 909

8472 👍 50

[BuyNow]

Amount Payable: $10.23 — 911

○ Pay from your MoneyCenter Payment Accounts: — 913

| Amex - Online - xxxxxxxxxxxx7868 |
| Amex - Online - xxxxxxxxxxxx7868 |
| USBank - eBayUse - xxxxxxxxxxxx3423 |
| DebitBank Account - Default |

— 915

○ Pay using your PayPal email address: — 917

[Proceed»] — 919

San Bruno

FIG. 9

FINANCIAL GADGETS

CROSS-REFERENCE TO RELATED APPLICATIONS

This application is a continuation of U.S. application Ser. No. 12/624,349, filed Nov. 23, 2009, which claims the benefit of prior U.S. Provisional Application No. 61/117,868, filed Nov. 25, 2008, each of which are incorporated herein by reference.

TECHNICAL FIELD

This disclosure relates to purchase and use of gadgets that use financial information.

BACKGROUND

As the Internet has grown in popularity, more users are turning to services provided over the Internet to help manage their finances.

These services can be provided by financial institutions, such as banks or credit card companies, or by account aggregators who aggregate and present user-specific financial information from multiple financial institutions.

Users typically use a user name and password to log-in to web page(s) maintained by a financial institution or an account aggregator. From the web page(s), the user can access online banking, electronic bill payment, account aggregation, and other online financial services.

Online banking provides a user access to his or her financial information and also offers a number of services to a user. Users can, for example, view their statements online, including transaction details and cancelled checks, transfer balances online, and apply for loans online.

Users can also use electronic bill payment to pay bills online by transferring money from an account to a creditor through the Internet. Many financial institutions and account aggregators allow a user to pay all of his or her bills from their web page(s). Users may also be able to schedule automatic payments to creditors from some financial institution and account aggregator web pages.

Account aggregation involves presenting financial information related to multiple accounts of a user in one place. Each account can be with a different financial institution. Account aggregation makes it easy for a user to quickly get a picture of his or her overall finances.

SUMMARY

In general, in one aspect, a method includes collecting in a computer system user-specific financial information from a financial institution and storing the user-specific financial information in the computer system. A plurality of gadgets are received in the computer system from a plurality of developers. Each gadget is associated with one or more developers. A notification is received in the computer system that a platform provider has certified one or more of the plurality of gadgets. A first web page is generated with the computer system and is provided to a client computer of a user. The first web page includes an interface through which the user can select a gadget from the one or more certified gadgets. A notification is received in the computer system that the user has selected a gadget, and the selected gadget is run on the computer system. Running a gadget includes providing user-specific financial information to the gadget and receiving output from the gadget. The user-specific financial information in the computer system is modified in response to the output of the gadget or content based on the output of the gadget is provided to the user.

Implementations can include one or more of the following features. Providing content based on the output of the gadget to the user can include generating a second web page on the computer system using the output of the gadget and providing the second web page to the client computer of the user. Providing content based on the output of the gadget to the user can also include sending a text message or an e-mail message to the user. An indication that the financial institution has authorized one or more of the certified gadgets can be received in the computer system. The interface can allow a user to select a gadget only from the one or more authorized gadgets. Selecting a gadget can be purchasing a gadget. Payment information associated with the purchase of the gadget can be received in the computer system. The payment information can include an amount owed and a payment source. A notification than an electronic payment equal to the amount owed has been received from the payment source can be received in the computer system. Electronic payments to the financial institution and the one or more developers associated with the gadget can be caused to be made. The one or more certified gadgets can be stored in the computer system.

The platform provider can determine whether to certify each of the plurality of gadgets according to whether the gadget performs its advertised functionality, whether there are any security concerns about the gadget, and whether there are any performance concerns about the gadget. The method can further include receiving in the computer system a notification that the user has requested that a gadget's access to the user's financial information be revoked, and revoking the gadget's access to the user's financial information.

In general, in one aspect, a computer program product, encoded on a computer-readable medium, is operable to cause a data processing apparatus to perform the method set out above.

In general, in one aspect, a system of one or more computers are programmed to perform operations comprising the method set out above.

In general, in one aspect, a method includes receiving in a computer system a plurality of gadgets from a plurality of developers. Each gadget is associated with one or more developers. A notification is received in the computer system that a platform provider has certified one or more of the plurality of gadgets. A notification is received in the computer system that a financial institution has authorized one or more of the certified gadgets. A first web page is generated with the computer system and is provided to a client computer of a user. The first web page includes an interface through which the user can select a gadget from the one or more authorized gadgets. A notification is received in the computer system that the user has selected a gadget. The selected gadget is run on the computer system and output is received from the selected gadget. A second web page is generated on the computer system using the output of the selected gadget, and the second web page is provided to the client computer of the user.

Implementations can include one or more of the following features. User-specific financial information from the financial institution can be collected and stored in the computer system. Running a selected gadget can include providing the user-specific financial information to the gadget. Selecting a gadget can be purchasing a gadget. Payment information associated with the selection of the gadget can be received in the computer system. Payment information can include an amount owed and a payment source. A notification can be received in the computer system that an electronic payment equal to the amount owed has been received from the payment source. Electronic payments to the financial institution and the one or more developers associated with the gadget can be caused to be made. One or more of the authorized gadgets can be stored in the computer system.

In general, in one aspect, a computer program product, encoded on a computer-readable medium, is operable to cause a data processing apparatus to perform the method set out above.

In general, in one aspect, a system of one or more computers are programmed to perform operations comprising the method set out above.

In general, in one aspect, a method includes collecting in a computer system user-specific financial information from a financial institution and storing the user-specific financial information in the computer system. A plurality of certified gadgets are received from a platform provider. Each gadget is written by one or more developers. A use notification is received in the computer system from the platform provider indicating that a user can use a gadget. The gadget is run on the computer system. Running a gadget includes providing user-specific financial information to the gadget and receiving output from the gadget. The user-specific financial information in the computer system is modified in response to the output of the gadget or content based on the output of the gadget is provided to the user.

Implementations can include one or more of the following features. Providing content based on the output of the gadget to the user can include generating a second web page on the computer system using the output of the gadget and providing the second web page to the client computer of the user. Providing content based on the output of the gadget to the user can also include sending a text message or an e-mail message to the user. The use indication can be user-specific and indicate that a user has purchased the gadget. The use indication can indicate that any user can use the gadget. An indication that the financial institution has authorized one or more of the certified gadgets can be received in the computer system, and only authorized gadgets can be run on the computer system. The plurality of certified gadgets can be stored in the computer system.

In general, in one aspect, a computer program product, encoded on a computer-readable medium, is operable to cause a data processing apparatus to perform the method set out above.

In general, in one aspect, a system of one or more computers are programmed to perform operations comprising the method set out above.

In general, in one aspect, a method includes collecting in a computer system user-specific financial information from a financial institution. The method further includes storing the user-specific financial information in the computer system, receiving in the computer system information identifying a plurality of gadgets from a plurality of developers, each gadget associated with one or more developers, and receiving in the computer system a notification that a platform provider has certified one or more of the plurality of gadgets. A first web page is generated with the computer system and provided to a client computer of a user. The first web page includes an interface through which the user can select a gadget from one or more certified gadgets and specify that the gadget can access the user-specific financial information. A notification that the user has selected a gadget is received. A request from the selected gadget is received and in response to the request, the user-specific financial information is provided to the gadget.

Implementations can include one or more of the following features. The method can further include modifying the user-specific financial information in the computer system in response to output received from the gadget. The method can further comprise running the selected gadget in the computer system.

In general, in one aspect, a computer program product, encoded on a computer-readable medium, is operable to cause a data processing apparatus to perform the method set out above.

In general, in one aspect, a system of one or more computers are programmed to perform operations comprising the method set out above.

The details of one or more embodiments are set forth in the accompanying drawings and the description below. Other features, objects, and advantages will be apparent from the description and drawings, and from the claims.

DESCRIPTION OF DRAWINGS

FIG. 5 is a screenshot of an example platform provider's web page running gadgets.

FIG. 6 is a screenshot of a second example of the platform provider's web page showing gadgets in a different configuration.

FIG. 7 is a screenshot of an example gadget store run by the platform provider.

FIG. 8 is a screenshot showing an example detail view web page with information about a gadget.

FIG. 9 is a screenshot showing an example payment page where users can input payment information to purchase gadgets.

DETAILED DESCRIPTION

Figure 1:
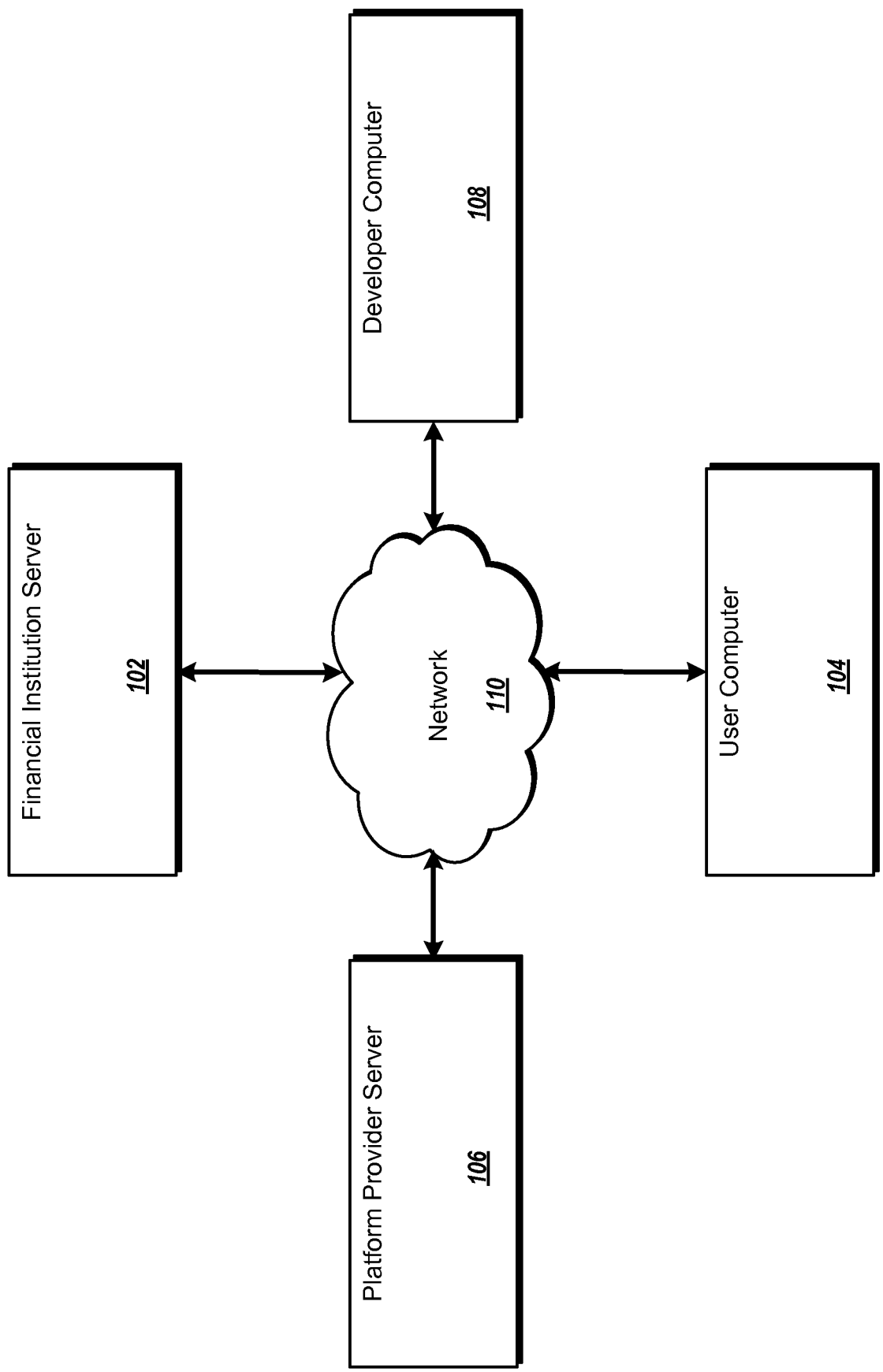
FIG. 1 is an illustration of the interactions of the computer systems of the four main parties.

FIG. 1 illustrates the interaction of the relevant parties. Computer systems 102, 104, 106 and 108 of a financial institution, a user, a platform provider, and a developer, respectively, are connected through a network 110, e.g., the Internet. While only one computer for each party is shown, each party can have multiple computers.

A financial institution is an institution that provides financial services, deals in financial instruments, or lends, invests, or stores money. Examples of financial institutions include banks, brokerage firms, credit card companies, credit unions, and savings and loans. The financial institution has financial information about users who have an account with the financial institution stored on its server 102, for example, in a database. The financial information can also be stored on the platform provider's server 106. A user can have an account with the financial institution when, for example, the user deposits money at the institution or has a line of credit provided by the institution.

Financial information includes, for example, customer data, account data, financial institution data, payee data, and transaction data. Customer data can include the customer's name and contact information, e.g., the customer's address, telephone number, and email address. Customer data can also include the customer's password or PIN. Account data can include the customer's account numbers, financial institutions, and account balances. The financial institution data can include the financial institution's name and address and the financial institution's ABA or routing number. Where the financial institution server 102 performs electronic payments to payees, the payee data can include the payee's name, contact information, e.g., the customer's address, telephone number, and email address, and can also identify the bank and account number to receive payment. The transaction data includes data for individual transactions, e.g., the identity of customer, the identity of payee, date of the transaction, the amount of payment, the account from or to which payment will be made, and a transaction identifier, e.g., a check number. Transaction data can also include additional information about the payee such as the payee's address or the bank and account number where the payee received the payment.

A user has an account with the financial institution and uses a computer 104 to access financial information related to that account from the platform provider's server 106 or the financial institution's server 102. The platform provider's server 106 or the financial institution's server 102 (whichever the user's computer 104 is interacting with) transmits data including the requested financial information to the user's computer 104. The user's computer 104 then presents the requested financial information to the user. A user may access information about multiple accounts at once.

The platform provider's server 106 runs applications that provide three main services: account aggregation, presentation of financial information, and a gadget platform. The platform provider's server 106 can provide these services directly to a user, or the platform provider can act as a backend provider and provide software, support, and other tools to a financial institution to allow the financial institution's server 102 to provide these services to a user. In some implementations the platform provider provides some of the services directly to a user and acts as a backend provider for other services.

When the platform provider's server 106 provides these services directly to a user, it can do so on behalf of the financial institution. In this implementation, the platform provider's server 106 can optionally brand communications it sends to the user's computer 104 with the financial institution's logo, colors, or other information so that the user, viewing the communication on his or her computer 104, believes he or she is interacting with the financial institution's server 102 rather than the platform provider's server 106. In brief, the platform provider's server 106 can store data associating financial institutions with graphic images and color codes, e.g., in a database. When the platform provider's server 106 generates a web page branded as a financial institution, the server 106 inserts the graphic images and color codes associated with the financial institution into the markup language document that is then sent to the user.

Account aggregation involves collecting financial information about a user. Data representing this information is optionally stored in a financial information repository, e.g., a database, on the platform provider's server 106 or the financial institution's server 102. The financial information can be collected directly by a platform provider's server 106 or by a financial institution's server 102 with backend support from a platform provider.

Financial information can be collected in different ways. For example, in some implementations, information is received directly from a financial institution's server 102. In some implementations, the platform provider's server 106 or the financial institution's server 102 run one or more agents to extract user-specific financial information from various web pages and other consumer-accessible channels, for example public OFX feeds. An agent is a computer program that extracts financial information by, for example, screen scraping by parsing the HTML code of web pages and identifying relevant information.

A web page is a block of data identified by a URL that is available on the Internet. One example of a web page is a HyperText Markup Language (HTML) file. Web pages commonly contain content; however, web pages can also refer to content outside the web page that is presented when the web page loads in a user's web browser. Web pages can also generate content dynamically based on interactions with the user.

A public OFX feed is a stream of financial data sent to another computer, for example, over the Internet, by a server of one or more financial institutions, where the data is formatted in accordance with the Open Financial Exchange standard.

Other commonly used methods of gathering financial information are also envisioned.

Financial information is presented to the user through one or more web pages sent by the platform provider's server 106 or the financial institution's server 102 to the user's computer 104. The web page(s) can also provide traditional on-line services associated with the financial institution. For example, for banks, credit unions, and savings and loans, these traditional on-line services include paying bills, transferring funds electronically, and reviewing statements. For credit card companies, the traditional on-line services include paying bills, reviewing transactions, reviewing statements, performing balance transfers between two credit cards, and requesting a credit line increase. For brokerage firms, the traditional on-line services include providing account information, providing information about a user's investments, supporting on-line trading, and providing real-time quotes.

These web pages can be generated directly by the platform provider's server 106 or by the financial institution's server 102 with backend support from the platform provider. Backend support includes software, support, and other tools that allow the financial institution's server 102 to generate web pages to present financial information to the user through the user's computer 104. These tools can be software based, hardware based, or both.

The platform provider's server 106 or the financial institution's server 102 with backend support from the platform provider also provides a platform for running gadgets and an interface to allow the gadgets to access stored financial information. Each gadget is managed and presented in a web portal generated by the platform provider's server 106 or the financial institution's server 102.

Figure 2:
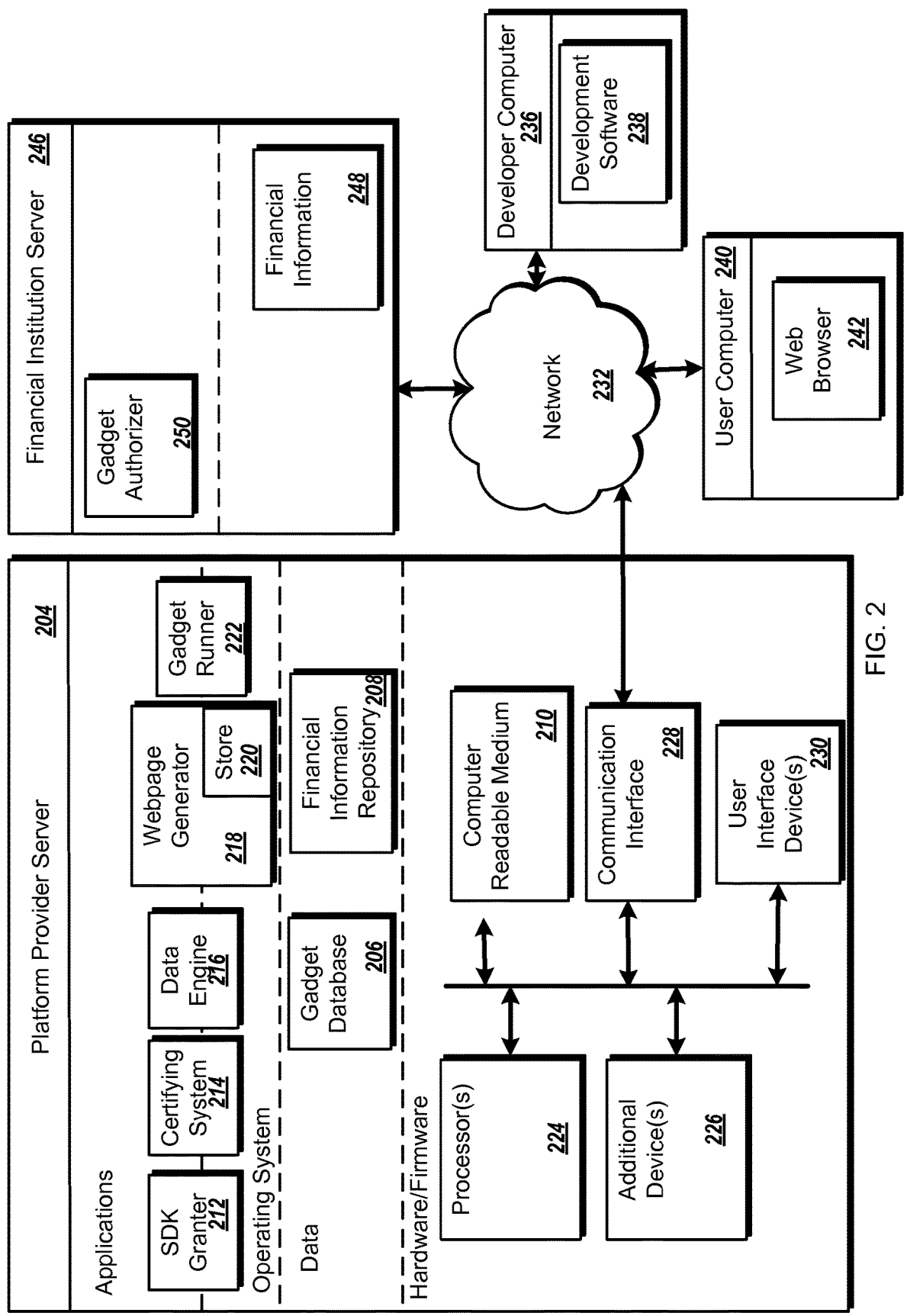
FIG. 2 is an example architecture of a first embodiment.
Figure 10:
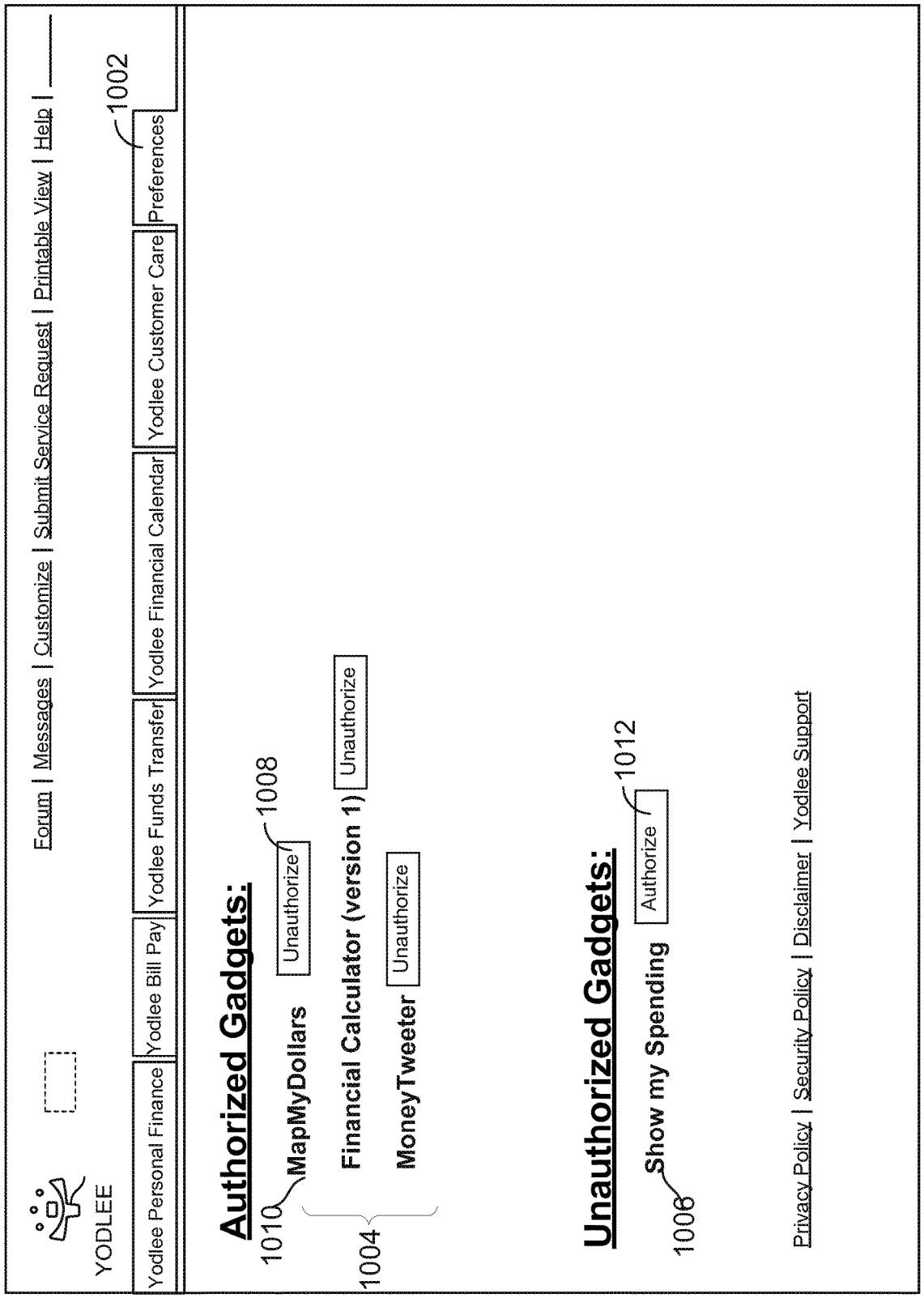
FIG. 10 is a screenshot of an example user preference page where a user can specify which gadgets have access to the user's personal financial information.

Generally speaking, a gadget is a computer program, run on the platform provider's server 106 as shown in FIG. 2 (or the financial institution's server 102 as discussed in the implementation as shown in FIG. 10), for example a portlet or a servlet. In various implementations, gadgets generate content for presentation on a user's computer 104. For example, a gadget can generate content, e.g., markup language and/or scripting language, that is provided to a web page server and inserted by the web page server into a web page (along with other content) that is transmitted for presentation by the web browser on the user's computer. A gadget generates content based at least in part on generally available information or user-specific information. The gadget can store generally available information and can access generally available information on the Internet. The gadget accesses generally available information on the Internet through standard techniques used, for example, by search engines, portals, and destination sites. For example, the gadget can use AJAX web services or RESTful web services to retrieve information from one or more web pages or web servers. In some implementations, the platform provider's server monitors and regulates calls made by the platform provider to outside servers or services.

The gadget can send a request for user-specific information to the platform provider's server 106 or financial institution's server 102 (whichever is running the gadget) by using the interface provided by the platform provider. This interface consists of commands for passing information and causing behavior, and it is specified in an gadget application programming interface (gadget API) described in documentation included in a gadget software development kit (gadget SDK) provided to the developer by the platform provider. The gadget SDK can also include tools for developers and other features commonly found in software development kits. User-specific information provided by the platform provider's server 106 or the financial institution's server 102 can include financial information.

Examples of functionality that can be provided by gadgets include recognizing discounts based on transaction history, providing spending insights and advice, exporting tax items, exporting medical payments, generating expense reports, tracking savings, monitoring 401/IRA/529 accounts, providing investment portfolio tools, generating schedule A, B, & D reports, tracking mileage, analyzing differences between expected expenses and income, helping users pay down debt, generating a combined asset/liability chart, importing user financial data from other sources, providing a credit card payoff calculator functionality, tracking a user's savings goals, determining mortgage payments, determining credit scores, determining auto valuations, determining asset forecasts, and providing a user with insurance offers tailored to his or her financial profile. Other gadget functionality is also envisioned.

In some implementations, gadgets provide services to a user, such as monitoring or modifying the user's financial information, without necessarily presenting content to the user through a web page. For example, a gadget could periodically scan a user's financial information looking for certain factors, such as a low account balance, and notify the user through a text message or e-mail message sent directly to the user. Gadgets can also make automatic payments, for example, electronically paying a user's cell phone bill from a user's account each month if sufficient funds are in the account and first transferring money from an additional account if sufficient funds are not in the account. In some implementations, content generated by these gadgets is at least periodically presented to the user through a webpage to allow the user to configure the gadgets.

In some implementations, rather than running on the platform provider's servers or a financial institution's servers, the gadgets can run on third party websites or on a user's own computer. In these implementations, the gadget requests needed financial information or needed financial actions from the platform provider's server (or the financial institution with support from the platform provider's server). The platform provider's server (or the financial institution with support from the platform provider's server) verifies that the gadget is authorized to access a user's financial data before providing the requested information or taking the requested action. Verification can include, for example, verifying a password or passkey provided by the gadget to the platform provider's server.

A developer uses a computer 108 to develop gadgets. A developer can be an independent third party, the platform provider, the financial institution, or a user. In one embodiment, the developer uses his computer 108 to develop gadgets that are run on the platform provider's server 106. In an alternative embodiment, the developer uses his computer 108 to develop gadgets that are run on the financial institution's server 102. The developer's computer 108 stores the gadgets as the developer is developing them. The developer's computer 108 can send completed gadgets to the platform provider's server 106 through the network 110. The platform provider's server 106 stores the completed gadgets, for example, in a gadget database.

The system allows a user to "purchase" and run gadgets developed by a developer. In one embodiment, the platform provider's server 106 runs the gadgets. In an alternative embodiment, the financial institution's server 102 runs the gadgets. In either case, in this context, the "purchase" is a purchase of the right to have the purchased gadget run on the appropriate server and have the content generated by the gadget incorporated into the web pages generated by the server and presented to the user on the user's computer. The "purchase" is also an implicit agreement by the user to allow the gadget access to the user's financial information. In some implementations, a user must "purchase" a separate copy of a gadget for each server on which the user wants to run the gadget. In some implementations, a user must "purchase" a separate copy of a gadget for each financial institution on whose data the user wants to run the gadget.

Running a gadget includes calling a copy of the gadget, running it on the server, interacting with the gadget using the interface provided by the gadget API—including providing financial information to the gadget, receiving output from the gadget, generating a web page including the output from the gadget, and sending data comprising the web page to the user's computer 104 through the network 110. Because the gadgets are resident on a computer system that stores the user's financial information, the gadgets can make use of the user's financial information essentially in real time without needing to access the user's financial information over the Internet from a computer system operated by another entity. In some implementations, calling a copy of the gadget includes instantiating a new copy of the gadget. In some implementations, calling a copy of the gadget includes calling a copy of the gadget that is already running.

In some implementations, the user uses his or her computer 104 to access gadgets through the platform provider's web page(s). In other implementations, the user uses his or her computer 104 to access gadgets through the financial institution's web page(s). By selecting gadgets with desired functionality, the user can customize his or her experience. The user can feel comfortable using gadgets with access to his or her financial information because each gadget is certified by the platform provider.

The system also allows the platform provider and financial institution to make more options available to the user. Platform providers and financial institutions sometimes have access to the financial information of users but do not have the resources to create computer program applications to provide all of the functionality a user would desire. Furthermore, even if they did have those resources, not all applications will appeal to all users. Different users have different needs they would like to have met by the online finance world. For example, some users want advanced tools to help them monitor their retirement accounts. Other users are looking for easy-to-use tools to help them stay within a budget. The combination of developer-created and user-selected gadgets means that users can be offered more options in a customized environment.

The system also provides for a new business model. The developer, platform provider, and financial institution all share in the proceeds from the sale of gadgets to users. The system allows the platform provider and the financial institution to leverage their preexisting relationship with the user and increase their respective incomes.

FIG. 2 illustrates an example architecture of a first embodiment.

A platform provider has one or more servers 204. While only one server is shown in FIG. 2, multiple servers can be used. In some implementations, at least one of the platform provider's servers 204 is a programmable general purpose computer. In some implementations, at least one of the platform provider's servers 204 is comprised of one or more computers in a server rack.

The platform provider's server 204 stores a gadget database 206. The gadget database 206 stores information about gadgets that have been transmitted from a developer's computer 236 to the platform provider's server 204, such as the gadget itself, the name of the gadget, the developer of the gadget, the features of the gadget, and the price of the gadget. In some implementations, the platform provider's server 204 also stores a financial information repository 208. The financial information repository 208 stores collected financial information of individual users.

The platform provider's server 204 runs a number of computer programs. In some implementations, the server runs an optional gadget SDK granter 212, a certifying system 214, a data engine 216, a web page generator 218 including a store generator 220, and a gadget runner 222.

The gadget SDK granter 212 is a computer program that determines whether a developer should be given access to the gadget SDK. The certifying system 214 is a computer program that is used in gadget certification. The data engine 216 is a computer program that extracts and gathers financial information about individual users from the financial institution's server 246 and web pages. In some implementations, the data engine 216 stores extracted financial information in the financial information repository 208.

The web page generator 218 is a computer program that generates one or more web pages. The store generator 220 is a computer program that generates web pages directed to selling gadgets to users.

The gadget runner 222 is a computer program that runs gadgets on the platform provider's server. Running a gadget can include instantiating or loading the gadget and interacting with the gadget through an interface. The interface allows commands and data to be passed back and forth between the gadget and the server. Interacting with a gadget through an interface can include receiving requests from the gadget, sending requested financial information to the gadget, receiving data including output from the gadget, and sending data including output of the gadget to the web page generator 218 to be incorporated into web pages presented to the user.

A developer typically has a programmable general purpose computer 236. The developer uses development software 238 on the computer to develop one or more gadgets and send them to the platform provider sever 204. In some implementations, the development software includes the gadget SDK.

A user 238 typically has a programmable general purpose computer 240. The user runs an web browser 242 on this computer, for example, Microsoft Internet Explorer™. The web browser 242 receives one or more web pages from a server run by the platform provider and presents the web pages to the user. Presenting the web pages to the user can include displaying the web pages on a computer monitor or other display device. Presenting the web pages can also include any other method of conveying information to the user, for example presenting sounds corresponding to the web pages or providing haptic feedback corresponding to the web pages.

A financial institution has one or more servers 246. While only one server is shown in FIG. 2, multiple servers can be used. In some implementations, at least one of the financial institution servers 246 is a programmable general purpose computer. In some implementations, at least one of the financial institution servers 246 is comprised of one or more computers in a server rack.

The financial institution's server 246 has a store of financial information 248. The store of financial information includes financial information pertaining to individual users. Optionally, the financial institution server also runs a gadget authorizer computer program 250. The gadget authorizer program determines whether or not a user can see specific gadgets.

Figure 3:
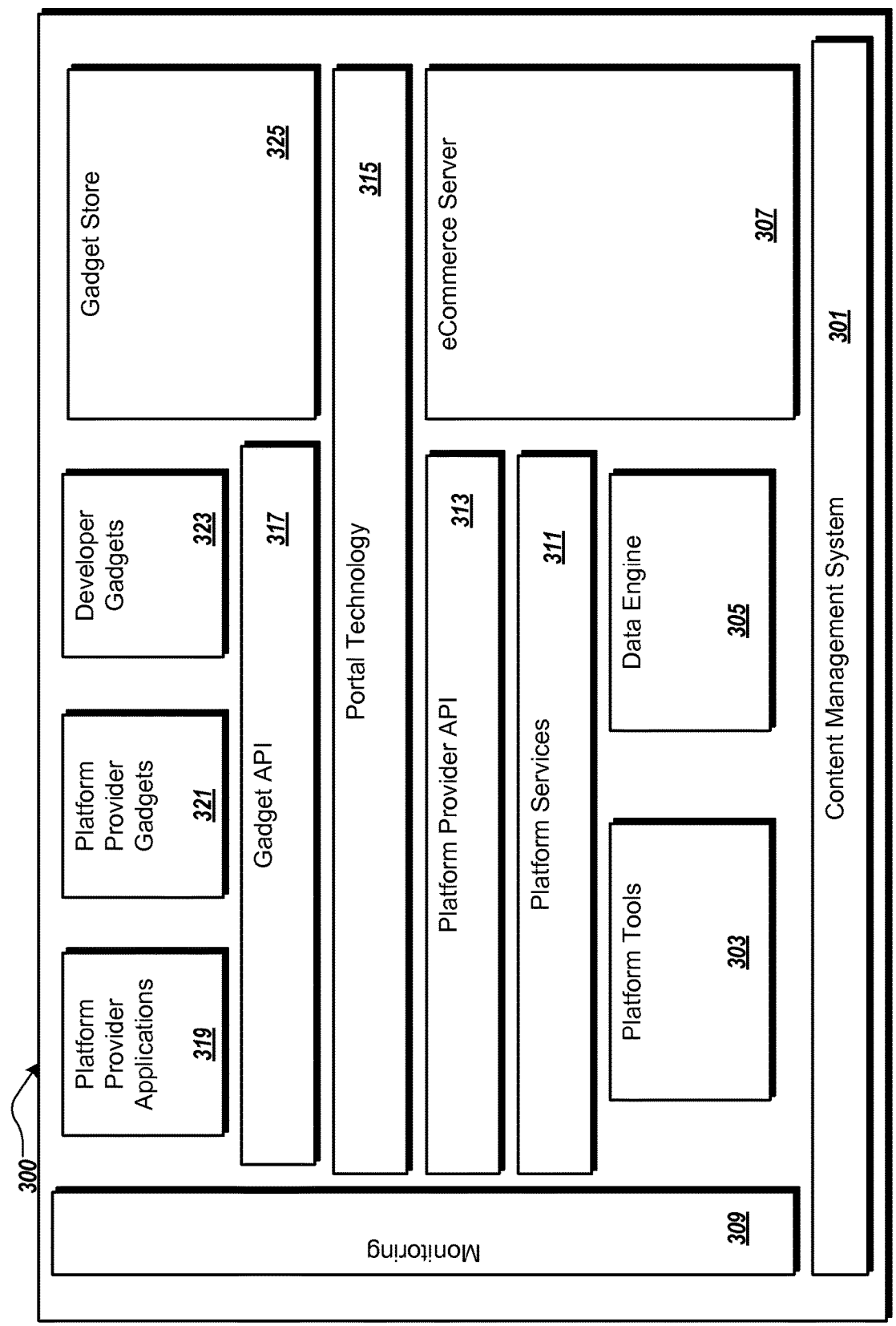
FIG. 3 is an example architecture of the platform provider's server in a first embodiment.

FIG. 3 illustrates a detail view of an example architecture 300 of the platform provider's server. One or more servers may be combined to give the functionality described in FIG. 3. As shown in FIG. 3, the platform provider's server runs a content management system 301. Platform tools 303, a data engine 305, and an eCommerce Server 307 all run on top of the content management system 301.

The content management system 301 manages the content of the web pages presented by the server. Content can include text, configuration parameters, and other settings that allow the financial institution to control the user's experience. The content management system 301 can include the data needed to brand web pages or other communications sent to the user's computer 104. For example, the content management system can include a database associating one or more financial institutions with color codes and/or graphic images of each financial institution's logo for use in generation of web pages. The content management system 301 can include the data needed to present web pages in different languages. In some implementations the content management system 301 acts as a single point of control for how web page content is presented to users.

The data engine 305 is used to extract and collect financial information about a user. The data engine may run one or more agents. Agents are computer programs that extract and collect financial information about a user, by, for example, screen scraping. Agents can perform additional tasks as well, for example, executing user transactions. The collected financial information can be stored in the data engine 305, e.g., in a relational database.

The platform tools 303 support the data engine. In some implementations, platform tools provide tools to traverse websites to search for data to extract, and monitor and support data engine agents. Platform tools can also provide aggregation services and support accessing data stored at remote sites. Platform tools can also provide support for performing calculations on extracted data.

Platform services 311 run on top of the platform tools 303 and data engine 305. Platform services 311 provide an interface of commands for accessing platform tools and the information stored in the data engine.

The eCommerce server 307 powers the gadget store generated by the platform provider's server. The eCommerce server provides the usual functionality provided by a conventional eCommerce server for purchases of other products, but directed to the purchase of gadgets. The functionality can include, for example, displaying and sorting lists of gadgets with associated information such as price, tracking past user purchases of gadgets, generating rankings of gadgets from user input, cataloging what gadgets are available, tracking user activity on the web pages that make up the store, supporting user-driven customizations of the web page store, and supporting shopping cart functionality to permit a user to select multiple gadgets for purchase as the user navigates the store.

A monitoring system 309 also runs on top of the content management system 301. The monitoring system monitors the behavior of the computer programs on the platform provider's server.

The platform provider API 313 acts as an interface to allow server programs and applications to access the underlying tools. The platform provider API 313 specifies how information and commands are passed between computer programs running on the server(s) and platform services 311.

The portal technology 315 controls the portal generated by the platform provider's server. In some implementations, the portal technology runs gadgets. In some implementations, the portal technology 315 provides a standard portal architecture with an application programming interface (API) that defines a portal page with content areas and commands that are used to populate the content areas. The portal technology provides a layer of abstraction in regard to what is presented by the portal.

The gadget API 317 is an interface that specifies how platform provider applications 319, platform provider gadgets 321, and developer gadgets 323 can exchange information and commands with the platform provider's server(s).

The store generator 325 generates the gadget store web pages and interacts with the eCommerce server 307 through the portal technology 315.

Figure 4:
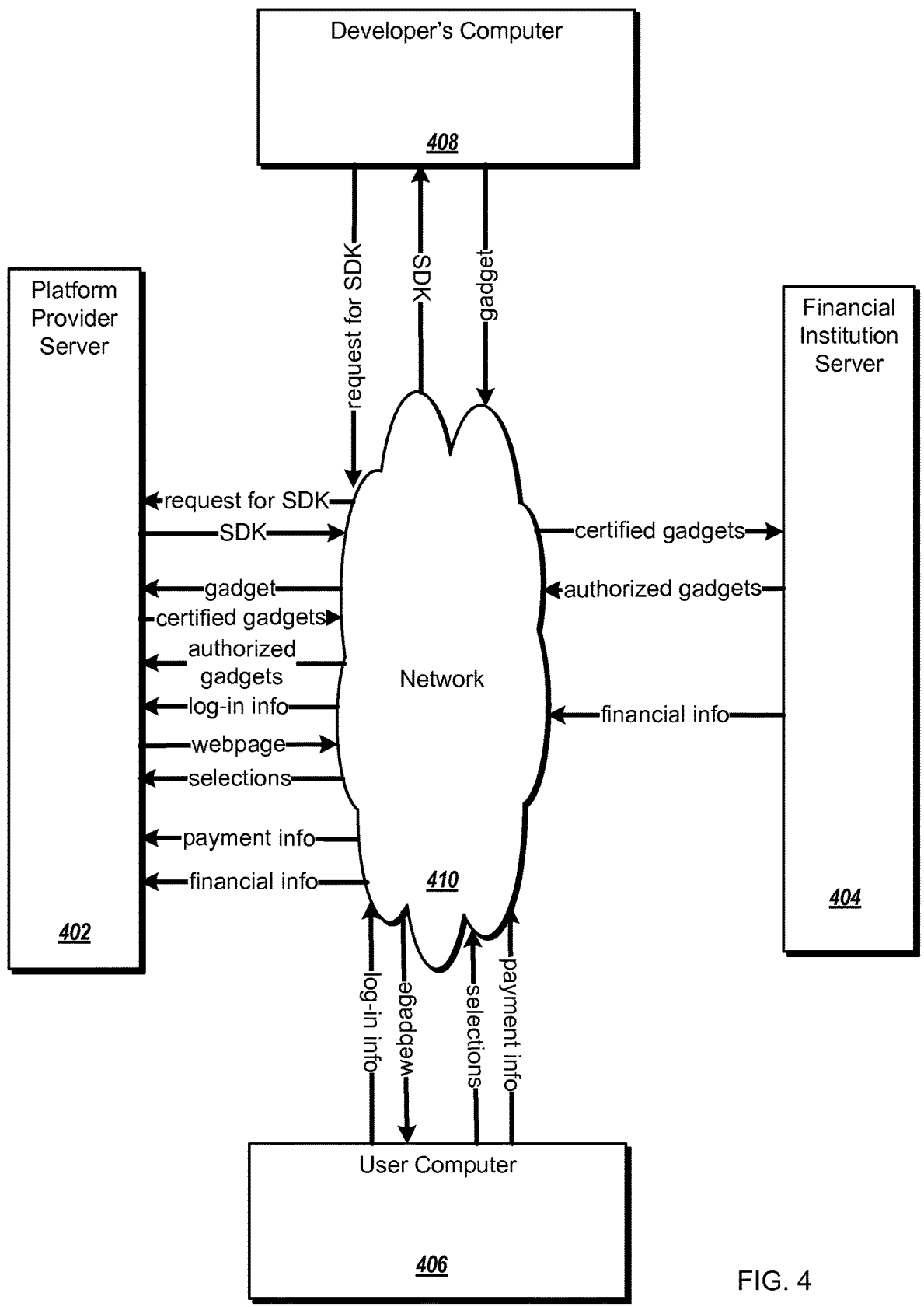
FIG. 4 illustrates information flow in a first embodiment.

FIG. 4 illustrates an example information flow in a first embodiment, in which the platform provider's server 402, the financial institution's server 404, a user's computer 406, and a developer's computer 408 are connected through a network 410. While only one platform provider's server, one financial institution's server, one user's computer, and one developer's computer are illustrated here, each party can use multiple computers.

A developer uses his or her computer 408 to send data indicating a request for access to the gadget SDK to the platform provider's server 402. When the platform provider's server 402 receives the data indicating the request, it optionally stores it in a list of requests. The platform provider then applies a screening process to determine whether or not to have its server 402 send the gadget SDK to the developer's computer 408.

In some implementations, the screening process includes an application process that limits access to the gadget SDK to developers who meet certain criteria. For example, the platform provider could deny access to the SDK to developers convicted of financial crimes. The screening process can include collecting information from the developer and collecting a fee from the developer. As another example, the screening process can require a developer to create an account with the platform provider. Creating an account can include, for example, creating a user name and password and providing the platform provider with certain information. For example, the developer can be required to provide his or her name, address, e-mail address, and a phone number. In some implementations, the developer must also sign an agreement indicating that he or she will follow the requirements of the platform provider.

In other implementations, access to the gadget SDK is freely available for all developers.

In some implementations, the platform provider's server 402 runs an SDK granter computer program to automatically determine whether to grant the developer's request. In other implementations, the platform provider's server 402 receives input from a human being, e.g., an employee of the platform provider, indicating a decision on whether to grant the developer's request. In either case, a database on the platform provider's server 402 can store identifying and contact information for each developer who has requested the gadget SDK and data indicating whether the developer has been granted access to the gadget SDK.

If the platform provider or the SDK granter computer program run on the platform provider's server 402 determines access should be granted, the platform provider's server 402 sends data including the SDK or information on how to access the SDK to the developer's computer 408. The developer's computer 408 may store the data.

The developer then uses the gadget SDK to develop a gadget to run on the platform provider's server. Development is done using the developer's computer 408, and the developer's computer 408 stores the gadget.

In some implementations, before the developer begins development on a gadget, the developer signs up to be a development partner with the platform provider. As part of the development partner sign-up process, the developer can be required to sign a contract specifying the terms of the financial agreement between the developer and the platform provider, as well as what is and is not allowed in gadgets developed by the developer.

The development partner can also be required to send additional information to the platform provider's server 402. This information can include, for example, an e-mail address, a phone number, and a payment account. The payment account is a financial institution account for the developer, where the developer wants to receive payment for gadgets he or she develops.

The platform provider's server 402 can use this information for identity verification purposes. For example, the platform provider's server 402 may initiate an e-mail verification process and/or a phone number verification process. These processes can include sending information to the developer at the specified e-mail address or phone number and requiring the developer to confirm his or her identity by sending the received information back to the platform provider's server. For example, the platform provider's server 402 can send information including a verification code and a verification website. The developer must then visit the verification website and enter the verification code in order to verify his or her identity.

As another example, the platform provider's server 402 may initiate a verification process based on the account information provided by the developer. For example, the platform provider's server 402 can initiate a credit check process to determine a credit score for the developer based on the provided account information. In some implementations, the platform provider's server 402 requires that the developer have a credit score that satisfies, e.g., exceeds, a threshold before the developer is verified. As another example, the platform provider's server 402 can initiate a background check process on the developer based on the provided account information. This platform provider's server 402 can then analyze the results of this background check process to ensure that a developer does not have a criminal record, before the developer is verified.

Other identity verification processes can also be used, for example, an identity verification service, such as Equifax, Inc. can be used.

Once a developer becomes a development partner, the platform provider's server 402 can provide various tools to help the developer with development. In some implementations, the platform provider's server 402 maintains a gadget wishlist that lists gadget features that users have expressed an interest in. The gadget wishlist can optionally include information such as how many users have requested a particular gadget feature on the wishlist.

In some implementations, the platform provider's server 402 generates a user interface and sends the user interface to the developer's computer 408. The user interface specifies what applications the developer is currently developing, along with details and optionally status of those applications.

In some implementations, the platform provider's server 402 also maintains a bug database. The bug database includes bugs and other service requests submitted by users of the developer's applications. The developer can use the bug database to manage and control responses to user bug reports.

In some implementations, the platform provider's server provides a sandbox testing environment. The sandbox testing environment is a testing environment run on the platform provider's server where a developer can upload and run gadgets that are under development. The testing environment mimics the conditions under which the gadgets would be normally be run on the platform provider's server 402. In some implementations, the sandbox testing environment is part of the same system that runs certified and purchased gadgets for users. In other implementations, the sandbox testing environment is part of a separate system.

Developers can test their gadgets in the sandbox testing environment using data received from various testing data sources. In some implementations, the test data is the developer's own account data. The platform provider's server 402 can optionally allow the user to create dummy account entries in his or her account data. This allows a user to safeguard his or her actual accounts from problems with the gadget. It also allows a user to create test accounts to specifically target particular test scenarios. For example, if a developer is interested in how a gadget will behave on a user account that has less than a particular balance, the developer can create a dummy account entry with less than the particular balance and then test the gadget using that account. In some implementations, the platform provider's server 402 provides the developer with test account data on which the gadgets can be tested. For example, the platform provider's server 402 can maintain a store of fake account data corresponding to one or more fake users and one or more accounts of those fake users, and then provide access to this fake account data to the gadget during testing.

The platform provider's server 402 can also provide developers with application guidelines. The application guidelines can be, for example, a document or documents stored on the platform provider's server 402 that specify the requirements for gadgets running on the platform provider's server 402. The requirements can include, for example, specific requirements that gadgets running on the platform provider's server 402 must meet, as well as specific prohibited activities that the gadgets will not be allowed to do. The guidelines can also include requirements such as specific technologies developers must use, a maximum size for gadgets, and a list of attributes that developers can specify for their gadgets. The attributes can include, for example, whether the gadget is compliant with requirements for users with disabilities (e.g., as set forth in the Americans with Disabilities Act), or a web address for developer-specific terms and conditions that govern a user's use of the gadget.

In some implementations, the platform provider's server 402 hosts a forum where developers can ask questions, either to each other, or to employees of the platform provider. For example, the forum can be a web-based forum hosted on the platform provider's server 402. Developers and platform provider employees can log-in to the forum, for example, using a user name and password. In some implementations, the forum has different sections including, for example, a public section where forum questions can be posed to all developers and employees, and a private section where forum questions can be posted to just platform provider employees. This division of the forum into multiple sections allows the platform provider to provide a confidential environment for developers to ask questions. In some implementations, platform provider employees can monitor the forum and inform developers when their gadget ideas will not satisfy the application guidelines of the platform provider.

Once a developer has finished testing his or her gadget, the developer can prepare the gadget to be run on other user data, for example, by incorporating standard code provided by the platform provider into the gadget. Then, the developer's computer 408 sends the gadget to the platform provider's server 402 through the network 410. This can include uploading the gadget to the platform provider's server 402 through a traditional web-based upload interface. In some implementations, the developer's computer 408 also sends data indicating the price of the gadget as set by the developer. In some implementations, data indicating the price of the gadget indicates a single price for the gadget. In some implementations, data indicating the price of the gadget indicates a tiered pricing structure, for example, $0.99 for a "light" version of the gadget, $9.99 for a "full" version of the gadget, and $9.00 to upgrade from the "light" version of the gadget to the "full" version of the gadget. The "light" version of the gadget has some, but not all, of the features of the "full" version of the gadget. In some implementations, the developer's computer 408 also sends data including additional information about the gadget, for example, a list of its features, whether a trial version is available, what upgrade options are available, if any, and the type of access to the gadget that will be sold. The type of access can specify, for example, that the user will have unlimited access to the gadget, that the user will pay based on usage of the gadget, or that the user will have unlimited access to the gadget until a particular date. In some implementations, the developer's computer 408 also sends data indicating that the gadget is "beta." A gadget that is "beta" is still under development and may not have been fully tested.

The platform provider's server 402 receives the gadget and any accompanying data from the developer's computer 408. The gadget and accompanying data are stored on the platform provider's server 402, for example, in a gadget database.

The platform provider then examines the gadget and certifies the gadget if it is safe to run. In some implementations, the examination is directed toward three goals: (1) making sure the gadget does what the developer claims and does not endanger a user's financial information, (2) eliminating gadgets that risk crashing the platform provider's server, and (3) analyzing the performance of the gadget. In some implementations, only the first two examinations are performed.

The examination may include gathering and analyzing background information on the developer, analyzing the gadget for robustness, analyzing whether the gadget complies with the developer's claims of functionality, and analyzing security or privacy concerns raised by the gadget.

In some implementations, the examination includes input from a human being e.g., an employee of the platform provider, as to whether the gadget should be certified. In this implementation, the platform provider's server 402 receives input from the human being indicating whether the gadget should be certified through its certification program.

In some implementations, certification is at least partly automated by the certification program. For example, a gadget can be automatically run and monitored for problems such as crashing the platform provider's server or transmitting user information without user permission.

For example, the determination of whether the gadget does what is claimed can be performed by one or more employees of the platform provider. These employees can analyze the code and run the gadget to determine whether the functionality is claimed. These employees can also analyze the code for hidden trap doors or other malicious code that would allow a developer or a third party unauthorized control over a user's financial accounts. This process could also be automated, for example, by running the gadget and automatically monitoring for unauthorized transmittal of user information or unauthorized activity on a user account.

As another example, the determination of whether the gadget will crash the platform provider's server 402 can be made using conventional software programs that run and analyze programs to determine, memory usage, disk requirements, and whether the program runs in infinite loops. Alternatively or additionally, a platform provider employee can manually analyze the code of the gadget.

As yet another example, the determination of whether the gadget has sufficient performance can be made using conventional software programs that analyze programs to determine, for example, whether the programs are making inefficient use of system resources or inefficient system calls. Alternatively or additionally, a platform provider employee can manually analyze the code of the gadget.

In some implementations, the platform provider can certify the gadget for use in some environments, but not in others. For example, if the developer has marked the gadget as "beta," the platform provider can certify it only for financial institutions that have indicated they are willing to authorize "beta" gadgets or for use by users who have indicated they are willing to run "beta" gadgets.

In some implementations, the platform provider's server 402 sends data to the developer's computer 408 to inform the developer whether the gadget was or was not certified, and optionally which environments the gadget was certified for. In some implementations, when a gadget is not certified (or is not certified for all environments), the platform provider's server 402 sends data to the developer's computer 408 to inform the developer that the gadget was not certified. In some implementations, this data can include an explanation of why the gadget was not certified. This explanation can be, for example, an identification of which of the three prongs described above the gadget failed, an identification of each specific test the gadget failed, or a brief summary of why the gadget was not certified. The explanation can optionally include suggestions for how to modify the gadget so that it will be certified.

In some implementations, the platform provider's server 402 maintains a versioning framework to track when modified versions of the same gadget are uploaded for certification.

The platform provider's server 402 stores data indicating that a gadget has been certified in its gadget database. In some implementations, the certified gadgets themselves are stored in the gadget database. In another implementation, data indicating information about the gadgets is stored in the gadget database. Information about a gadget may include, for example, where the gadget is stored, which financial institutions have authorized the gadget, who developed the gadget, the price of the gadget, a list of the gadget features, and which customers are authorized to use the gadget. Information about a gadget can also include data that the platform provider's server 402 receives from the developer's computer 408 along with the gadget.

The platform provider's server 402 then sends data indicating information about certified gadgets to a financial institution's server 404. This information can include, for example, the developer of the gadget, the price of the gadget, the functionality of the gadget, any co-branding of the gadget, and the gadget itself.

The financial institution determines which gadgets certified by the platform provider should be authorized. The financial institution can determine which gadgets to authorize using whatever criteria it deems appropriate. The criteria may include not authorizing gadgets developed by or branded by competing financial institutions, not authorizing gadgets that compete with gadgets that the financial institution has created, not authorizing gadgets that compete with services provided by the financial institution, and only authorizing gadgets that are branded with the financial institution's name.

In some implementations, the examination includes input from a human being e.g., an employee of the financial institution, as to whether the gadget should be authorized. In this implementation, the financial institution's server 404 receives input from the human being indicating whether the gadget should be authorized. Optionally, the financial institution can at least partly automate the authorization process through a gadget authorization program on its server 404. For example, the information about the gadget can be analyzed and gadgets developed by competing financial institutions can be rejected.

Data indicating the decision to authorize a gadget can be stored on the financial institution's server 404 or transmitted directly to the platform provider's server 402.

The financial institution notifies the platform provider's server 402 of the gadgets it has chosen to authorize. Notification can be done in a number of ways including, for example, through e-mail sent from the financial institution's server 404 to the platform provider's server 402 or through an interface on a web page generated by the platform provider's server 402 and provided to the financial institution's server 404.

In some implementations, rather than receiving an explicit authorization decision for each gadget, the platform provider's server 402 receives criteria from the financial institution's server 404. These criteria specify what factors the financial institution would consider when determining whether to authorize a gadget. The platform provider can then apply these criteria as a proxy for the financial institution.

The platform provider's server 402 stores data indicating that a particular gadget is approved by a particular financial institution 404 in the gadget database on its server.

In some implementations, after a gadget is certified, a developer can chose to remove the gadget. For example, the developer can use the developer computer 408 to view a web page generated by the platform provider's server 402. This web page can list the gadgets the developer has developed and can include a mechanism through which the developer can remove the gadget from sale. If a developer wants to remove a gadget, the developer can use the mechanism in the web page to send data to the platform provider's server 402 indicating that the gadget should be removed. The platform provider's server 402 can then remove the gadget.

A user interacts with the platform provider through the web pages generated by the web page generator computer program on the platform provider's server 402. The web page generator generates web pages. The platform provider's server 402 then transmits data comprising the web pages to the user's computer 406 through the network 410. The user's computer 406 receives the data comprising the web pages and presents the web pages to the user in a web browser. The user's computer 406 receives selections and other input from the user and transmits a notification of the user's selection to the platform provider's server 402 through the network 410.

In some implementations, to view the web pages generated by the platform provider's server 402, the user's computer 406 transmits data including login information to the platform provider's server 402 through the network 410. Login information includes some user identifying information. For example, the user identifying information can be the MAC address of the user's computer or a username and password. The platform provider's server 402 receives the data including login information from the user's computer 406. The platform provider's server 402 then uses the login information to determine and verify the user's identity.

In some implementations, to view the web pages generated by the platform provider's server 402, the user's computer 406 transmits login information to the financial institution's server 404 through the network 410. The financial institution's server 404 then sends data comprising an authentication message to the platform provider's server 402 through the network 410. The platform provider's server 402 uses the authentication message to determine and verify the user's identity.

Once the platform provider's server 402 verifies the identity of the user, the user can use his or her computer 406 to load various web pages generated by the platform provider's server 402 and transmitted to the user's computer 406 through the network 410. The platform provider's web pages at least allow a user to see his or her financial information from one or more financial institutions, run gadgets, and purchase gadgets from a gadget store. However, additional options may also be available to a user.

A user can run available gadgets, for example, through a dashboard tab of one of the web pages generated by the platform provider's server 402. The dashboard tab has configurable views to allow a user to run multiple gadgets at the same time. In some implementations, a purchased gadget can be run in response to user request. When a user's computer 406 receives a notification that a gadget should be run, the computer 406 transmits a run notification to the platform provider's server 402. In response to receiving the run notification, the platform provider's server 402 runs the gadget using a gadget runner computer program. The platform provider's server 402 generates a web page including output from the gadget. The platform provider sends data representing this web page to the user's computer 406. The user's computer 406 then presents the web page to the user. In some implementations, a purchased gadget runs on the platform provider's server 402 automatically, e.g., each time a web page is generated that includes a portal with the gadget.

In some implementations, only gadgets certified by the platform provider, authorized by the financial institution, and purchased by the user can be run by the platform provider's server 402.

The platform provider's server 402 runs a gadget by, for example, calling a copy of the gadget, providing system resources to the gadget, and communicating with the gadget through a software or hardware interface, for example, through commands specified in a gadget API. In some implementations, the platform provider's server 402 only allows a given gadget access to particular parts of the gadget API (or particular APIs, if the gadget API consists of multiple APIs). The platform provider's server 402 can make the determination as to what parts of the gadget API are needed, for example, from the description of the gadget provided by the developer at the time the gadget is registered. In some implementations, the platform provider's server informs the developer which APIs, or which part of the API, the gadget will be allowed to access. The platform provider's server can do this, for example, by sending data to the developer's computer for presentation to the developer. This limited access to APIs allows the platform provider's server to better reduce the risk that a rogue gadget will cause harm to the system.

In some implementations, calling a copy of the gadget includes instantiating a copy of the gadget. In some implementations, calling a copy of the gadget includes calling a copy of the gadget that is already running on the platform provider's server.

When a gadget needs user-specific financial information from the platform provider, the gadget uses commands specified in the gadget API to send a request for the information to the platform provider's server 402. The platform provider's server 402 receives the request and uses its data engine computer program to collect the needed information. The platform provider's computer 402 then sends the needed information to the gadget.

In some implementations, the data engine computer program on the platform provider's server 402 collects user-specific information on the fly, in response to a gadget request for user-specific information. In another implementation, the user-specific information is collected in advance by the data engine program on the platform provider's server 402 and is stored in the financial information repository on the platform provider's server 402.

In some implementations, the data engine computer program on the platform provider's server 402 uses agents to collect data including financial information. These agents can use many techniques to collect financial information. For example, agents can navigate to relevant websites, and parse the HTML code of the websites to extract financial information based on a template. The template can be generated by humans, sometimes with input from the user. If a user name or password is needed to access a web page, the agent can use a stored user name and password of the user or can register the user with the web page to create an account for the user. Agents can also search the Internet, including using private search engines available on individual websites. These techniques are explained in more detail in U.S. Pat. Nos. 6,871,220, 6,567,850, 6,278,993, 6,199,007 and 7,200,804, and U.S. Patent Publications 2007/0180380 and 2007/0130347, all of which are incorporated by reference.

In another implementation, the platform provider receives data including financial information in useable form directly from the financial institution's server 406.

In some implementations, a user or the platform provider, can revoke a gadget's access to financial information of the user. This can occur, for example, when the user changes his or her mind about running the gadget, or is concerned that the gadget may be fraudulent. The user revokes a gadget's access to his or her financial information by sending a request to the platform provider's server 402. For example, the user can view a settings webpage generated by the platform provider's server's 402 and presented by the user's computer 406. The user can then provide input to his or her computer 406 requesting that a specific gadget have its access to financial information of the user revoked. The user's computer 406 then sends data indicating this request to the platform provider's server. The platform provider's server then revokes the gadget's access, for example, by updating data stored in the gadget database, or by updating a token associated with the gadget to indicate that the gadget no longer has authorization to access the user's financial information.

A user can also use his or her computer 406 to select, or "purchase" gadgets from the gadget store generated by the platform provider's server 402. The gadget store includes web pages generated by the web page generator computer program and eCommerce server on the platform provider's server 402. The platform provider's server's web page generator program generates web pages to present gadgets available for purchase. The platform provider's server 402 transmits data comprising these web pages to the user's computer 406 through the network 410. The user's computer 406 receives the data from the platform provider's server 402 and presents the web pages to the user through a web browser. The user interacts with the generated web pages to view information available from the gadget store. The generated web pages provide at least the functionality of a conventional web storefront, such as presenting prices, presenting ratings, and providing a shopping cart feature where a user can collect gadgets for purchase at a later time as the user navigates the store.

When a user selects one or more gadgets to purchase, the user's computer 406 sends a selection notification to the platform provider's server 402 through the network 410. When the platform provider's server 402 receives this notification it creates a purchasing web page where the user can enter payment information. Data comprising this web page is sent by the platform provider's server 402 to the user's computer 406 through the network 410. When the user's computer 406 receives the data, it presents the web page to the user.

In some implementations, the account information for any accounts the platform provider is aware of is pre-entered and the user can select from his or her accounts. In another implementation, the user 406 is asked to directly input payment information.

The user's computer 406 receives input from the user indicating a payment selection and optionally other payment data. The user's computer 406 then sends data comprising the selection and any other payment data to the platform provider's server 402 through the network 410. When the platform provider's server 402 receives the data, it updates the information stored in the gadget database to reflect that the user is authorized to run the purchased gadget, e.g., by storing a token in the gadget database indicating that the user is authorized to run the purchased gadget and that the gadget is authorized to access the user's financial information. The platform provider's server 402 optionally also stores the payment data, for example, in a payment database, to allow later collection of money from the user. In some implementations, the platform provider's server 402 receives data comprising a notification of an electronic payment. In some implementations, the user's computer sends data authorizing a third party to send data comprising an electronic payment notification to the platform provider's sever 402.

Money from user purchases is distributed by the platform provider. The user pays the platform provider. The platform provider in turn shares the payment with the financial institution and the developer. In some implementations, the financial institution receives 30%, the platform provider keeps 30%, and the developer receives 40%. Other distributions are possible. In general, however, the platform provider, developer, and financial institution each receives some share of the payment. In some implementations, the platform provider's server 402 distributes the money by making electronic payments.

In some implementations, the user's computer 406 receives input from the user specifying a configuration of the gadget and sends data comprising the gadget configuration to the platform provider's server 402 at the time the user purchases the gadget. The platform provider's server 402 optionally stores the data comprising the gadget configuration.

The following figures illustrate views of the platform provider's web pages as seen by the user. In each, the platform provider's server has generated a web page containing the information described and has transmitted data comprising the web page to the user's computer. The user's computer has received the data comprising the web page and presented the web page to the user.

The user's computer can receive input from the user regarding the web page. When the user's computer receives this input, it transmits data indicating a user's selections and other relevant user input to the platform provider's server. The platform provider's server generates a new or updated web page based on the data it receives from the user's computer and transmits data corresponding to the new or updated web page to the user's computer for presentation to the user.

FIG. 5 illustrates a view of the platform provider's web page in the first embodiment as seen by a user. A user has logged into the platform provider's web page and selected the dashboard tab 501. The dashboard tab allows a user to run gadgets on the platform provider.

Three gadgets are displayed: a map my dollars gadget 503, a mortgage calculator gadget 505, and a live quotes gadget 507. The map my dollars gadget displays a map with information about where the user has spent money. The mortgage calculator allows the user to determine the payments he or she would make on a new mortgage. The live quotes gadget displays quotes of interest to the user.

The platform provider's web page dashboard tab view provides additional options. A user can change the layout of the gadgets through the change view links 509. Each link will present a user's gadgets in a different configuration. In some implementations, additional links allow users to move or delete widgets from the dashboard.

A user can also view the gadget store, run by the platform provider, through the new gadgets available now link 511. In some implementations, the platform provider's web page dashboard tab view also allows a user to configure one or more gadgets.

Each web page generated by the platform provider provides several branding opportunities, as illustrated in FIG. 5. Here, Yodlee is the platform provider, so a Yodlee logo 517 identifies that Yodlee is affiliated with the web pages being presented. In some implementations, if the platform provider was generating the web pages on behalf of a financial institution, the financial institution's logo would appear at 517 instead. In some implementations, the financial institution's logo would appear at 515 beside the platform provider's logo at 517.

In addition, in some implementations, a financial institution can choose to co-brand an individual gadget. In this implementation, the financial institution's logo appears next to the name of the gadget at 513. In some implementations, a developer receives payment(s) from the financial institution in exchange for co-branding rights.

FIG. 6 illustrates a second example view of the platform provider's web page where the user has selected the dashboard tab and changed the configuration of the gadgets through the change view links. In contrast to FIG. 5, the map my dollars gadget 603 is larger than the two other gadgets 605 and 607.

Figure 7:
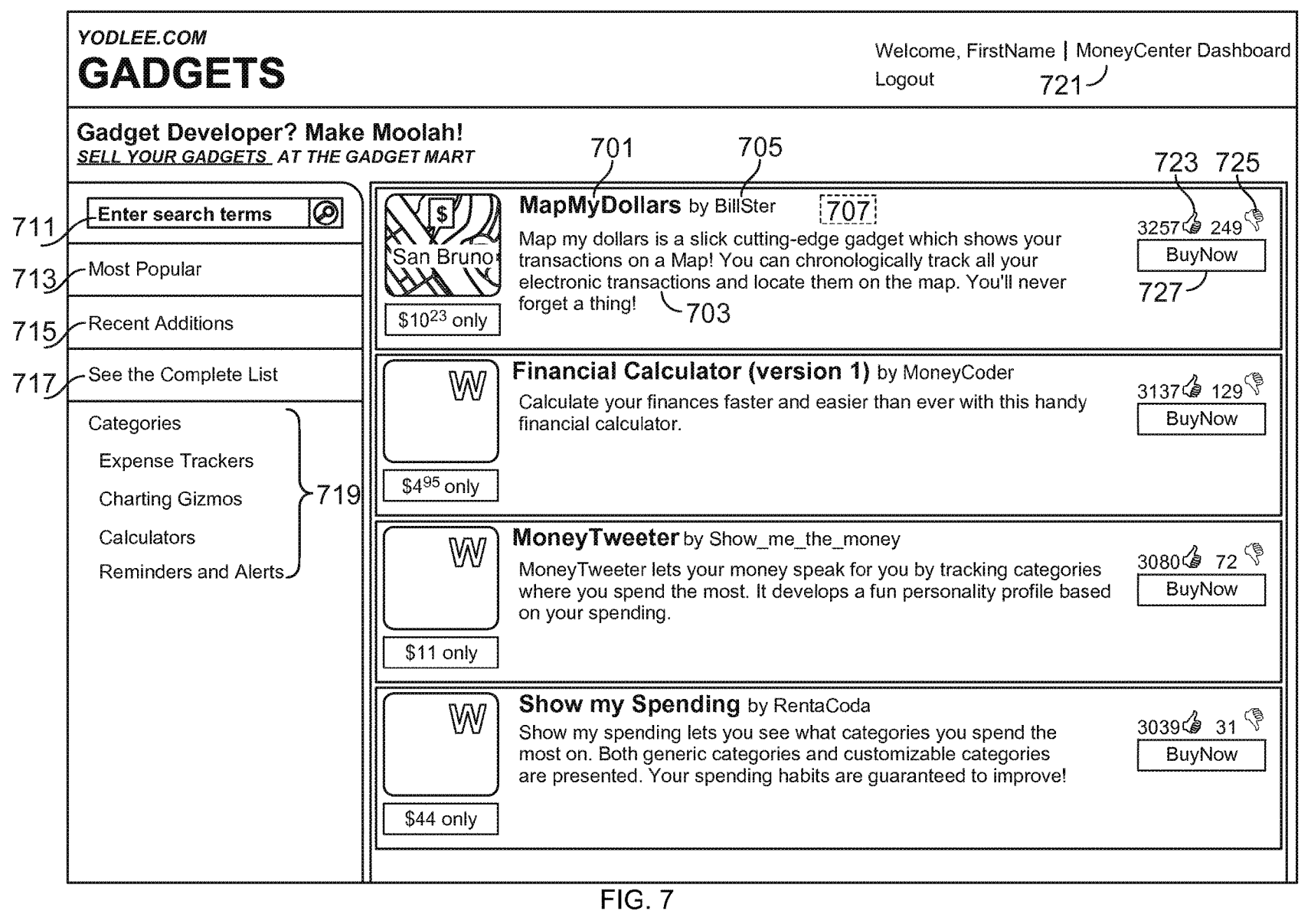

FIG. 7 illustrates a gadget store run by the platform provider and accessible to the user through the platform provider's web page. The store allows users to purchase different gadgets at different prices. In some implementations, a user makes a one-time payment for the gadget. In some implementations, the user pays for the gadget on a subscription basis, e.g., a payment per month or year. In some implementations, the price is set by the developer. In some implementations, the purchase price of at least one gadget is $0.00.

In the main view, each gadget is listed with an identifying name 701 along with a brief description 703, name of the developer 705 and optional co-branding 707.

A user can change the gadgets shown or the sorting order of the gadgets in the list through the options at the left of the screen. A user can enter search terms in the box 711, see the most popular gadgets (or sort by popularity) by clicking on the link 713, view new gadgets (or sort by date of the gadget) by clicking on the link 715, see all gadgets (e.g., sort by name alphabetically) by clicking on the link 717, or view gadgets by categories using the links 719. In some implementations (not shown) users are presented with a link, that when selected, shows them their recently viewed widgets.

In some implementations, only gadgets authorized by a user's financial institution are presented to the user. In another implementation, all gadgets are presented to the user, but those gadgets not authorized by a user's financial institution are not selectable.

Near, e.g., to the right, of each gadget description is a rating generated by input from multiple users, e.g., telling the user how many people have given the gadget a good rating 723 and how many have given the gadget a bad rating 725. In some implementations, the gadget store web page can also include additional information about each gadget. This information can include information about the developer, ratings of the developer or the gadget, suggested gadgets based on the gadgets the user has purchased in the past, and other information shown in conventional web storefronts. This information can also be provided in the gadget detail view.

In some implementations, the rating is a tally of how many users have said they like the gadget or developer and how many users have said they do not like the gadget or developer. In another implementation, the rating reflects individual user rankings of individual developers and individual gadgets on a scale.

Users rate a gadget or developer as follows. Input indicating a rating is received from a user by the user's computer. The user's computer sends data indicating the rating to the platform provider's server. The platform provider's server receives this data and stores it, for example, in the gadget database. In some implementations, the platform provider does not store the raw data but instead stores only an aggregated rating which is updated when the platform provider's server receives data indicating a rating from a user's computer.

In some implementations, user comments about a particular gadget or a particular developer are also collected by the platform provider's server and presented to other users through the store web pages generated by the platform provider's server. In some implementations, developers are given the chance to respond to comments. The platform provider's server collects the responses and presents them on a web page sent to at least one user. In some implementations, users are encouraged to leave feedback about developers and gadgets through frequent reminders. Other rating systems used by conventional storefronts are also envisioned.

When a user enters a comment on the web page, the user's computer receives the input from the user and sends data including the comments to the platform provider's server. The platform provider's server receives the data, and may store it, for example, in the gadget database. When a developer enters a response, the developer's computer sends data including the response to the platform provider's server. The platform provider's server receives the data, and may store it, for example, in the gadget database.

The data indicating comments and responses are used by the web page generator when generating the detail view web page of the gadget.

In some implementations, users can flag potentially fraudulent activity through a fraud rating system. While a typical rating system allows a user to rate a gadget or developer based on the quality of the developer's product or customer service, the fraud rating is used to indicate potentially fraudulent behavior, beyond the realm of just a poorly performing product.

When a user's computer receives input from a user indicating that a gadget is potentially fraudulent, the user's computer transmits data indicating the gadget may be fraudulent to the platform provider's server. The platform provider's server receives the data and in some implementations stores the data, for example, in the gadget database. In some implementations, when the platform provider's server receives the data indicating that a gadget may be fraudulent, the platform provider's server can trigger a reevaluation of the certification of the gadget. In some implementations, triggering a reevaluation of the certification of the gadget includes temporarily disabling the gadget. In some implementations, temporarily disabling the gadget includes removing the gadget from display in the gadget store. In some implementations, temporarily disabling the gadget includes blocking users from purchasing the gadget from the gadget store. In some implementations, temporarily disabling the gadget includes blocking the gadget from being run on the platform provider's servers.

In some implementations, the store web page includes gadget recommendations based on gadgets the user has purchased in the past. The recommendations can be determined by the platform provider's server using conventional techniques, such as relying, in part, on data indicating what the user has purchased in the past and data indicating what other users have purchased in the past. Data indicating past purchase habits can be stored on the platform provider's server.

The user can click on the buy now button 727, and be taken directly to the payment page. The user can also click on the name of the gadget 701 and be taken to a detail view page with more information about the gadget.

The user can return to the dashboard tab view by clicking on the link 721.

FIG. 8 illustrates a view of a web page from the gadget store with details concerning a particular gadget The detail view gives additional information about the particular gadget. The name of the gadget 801 and the developer of the gadget 803 are listed at the top of the page along with a short description of the gadget 805. In some implementations, the page further displays whether the gadget is "beta." Co-branding information may optionally be shown at 807. To the left, the price of the gadget is displayed in a box 809. In some implementations, multiple prices of the gadget are displayed, corresponding to multiple versions of the gadget, for example, $0.99 for a "light" version of the gadget, $9.99 for a "full" version of the gadget, and $9.00 to upgrade from the "light" version of the gadget to the "full" version of the gadget. A demonstration version of the gadget 811 is in the middle of the screen. In some implementations, this demonstration version is a fully interactive, fully functioning version of the gadget. In another implementation, the demonstration version is a picture or screenshot of the gadget user interface.

Underneath the demonstration version of the gadget 811 is a list of gadget features 813. The list of gadget features contains a description or highlights of gadget functionality. In some implementations this list of features is sent to the platform provider's server by the developer's computer and is stored on the platform provider's server, for example, in the gadget database. In some implementations, this list of features includes one or more categories of functionality selected by the developer from a list of categories of functionality maintained by the platform provider. In these implementations, the developer's computer notifies the platform provider's server of the one or more categories selected by the developer by, for example, sending data indicating the developer's selection to the platform provider's server. In some implementations, data indicating the developer's selections is stored on the platform provider's server. In some implementations, the platform provider verifies the list of features, for example, at the time the gadget is certified.

Below the list of gadget features 813 is a list of additional gadgets created by the same developer 815. This list gives the names of each gadget and can include a link to the detail page corresponding to each gadget. Additional information, for example a description of each listed gadget, can also be shown.

In some implementations, this list is generated by the platform provider's server. In some implementations, not all gadgets created by the developer are listed. The platform provider's server applies certain criteria to reduce the number of gadgets listed. These criteria can include ranking the gadgets and only listing a certain number of gadgets. The ranking can be, for example, how new the gadget is, how popular the gadget is, or a random order.

In another implementation, the developer's computer sends data including which gadgets should be listed to the platform provider's server when, for example, the gadget itself is sent to the platform provider's server. The platform provider's server receives this information and stores it, for example, in the gadget database.

Below the list of additional gadgets created by the same developer 815 is a comments section 817. The comments section allows a user to add a comment using the add a comment link 819. The user enters his or her comments using his or her computer. The user's computer sends data including the user's comments to the platform provider's server. The platform provider's server receives this data and stores it, for example, in the gadget database.

When the platform provider's server generates the detail view page for the gadget it includes user comments in the web page.

Rating information is displayed in the upper right hand corner, where the user can see the number of people who said they liked the gadget 821 and the number of people who said they did not like the gadget 823.

The user can navigate to other gadgets using the navigation choices 825 on the left of the page.

The user can use the buy now button 827 to purchase the gadget. In some implementations, when there are multiple versions of a gadget, the user can give additional input specifying which version he or she wishes to purchase.

In some implementations, additional options are provided to the user through the user interface. For example, the user interface can include an "add to wishlist" button to allow the user to add the gadget to a list of gadgets the user is interested in. As another example, the user interface can include an "e-mail a friend" button that takes the user to another user interface where he or she can enter an e-mail address of a friend and e-mail the friend information about the gadget.

FIG. 9 illustrates the payment information page, where a user enters his or her payment information and purchases one or more selected gadgets. The name of the selected gadget 901, the developer of the gadget 903, a brief description of the gadget 905, and optional co-branding information 907 are displayed on this page. In FIG. 9, only one gadget has been selected for purchase, but a user can select multiple gadgets for purchase at the same time.

The price of the gadget appears in a box on the left 909. The amount payable 911 is also displayed to the user.

The user has two options to pay for the gadget. The user can select the option to pay from an account the platform provider already monitors for the user 913 in which case the user then selects his or her account information from the dropdown box 915. The platform provider's server populates the dropdown box 915 with collected user account information. Alternatively, the user can select the option to pay by PayPal 917 and enter his or her e-mail address. PayPal is an example of a service that allows users to purchase goods on the Internet by entering their e-mail address and a password. While PayPal is used in FIG. 9, any service that offered to let users make payments for Internet goods could be used, for example PayPal, Google Checkout, Payment Trust, Authorize.net, or iPayment. In an alternative embodiment, account information is not pre-entered and the user must directly input his or her payment information.

While only two payment options are shown in FIG. 9, other payment options, for example, the option to pay by check or money order, can alternatively or additionally be provided to the user.

Once the user has entered his or her payment information, he or she can click on the proceed button 919 which takes him or her to a confirmation screen. This causes the user's computer to process the user's input specifying the payment information. The user's computer sends data indicating the user's payment information to the platform provider's server through the network. The platform provider's server stores data indicating that the user is now authorized to run the gadget, for example, in its gadget database. The platform provider's server may also store data indicating the user's payment information, for example, in a payment database, to facilitate collecting the payment from the user in the future.

The purchased gadget will now show up in the dashboard tab view of the platform provider's web page.

FIG. 10 illustrates an example user preference page where a user can specify which gadgets have access to the user's personal financial information. The user can navigate to the preferences page, for example, by selecting a preferences tab 1002 in a user interface generated by the platform provider's server.

The preference page lists authorized gadgets 1004 and unauthorized gadgets 1006. Each authorized gadget is a gadget that the user has specified can access his or her personal information. By default, a user authorizes a gadget to access his or her personal information when the user purchases the gadget. Each unauthorized gadget is a gadget that the user has specified cannot access his or her personal information.

A user can use the buttons provided in the preferences page to switch authorized gadgets to unauthorized gadgets, and vice versa. For example, the user can select the unauthorized button 1008 to indicate that the MapMyDollars gadget 1010 should be unauthorized. Similarly, the user can select the authorize button 1012, to indicate that the Show My Spending gadget 1006 should be authorized.

While the preferences page shown in FIG. 10 only lists the names of the gadgets, additional information about the gadgets, such as a description of the gadget, the developer of the gadget, or ratings for the gadget can also be shown.

Figure 11:
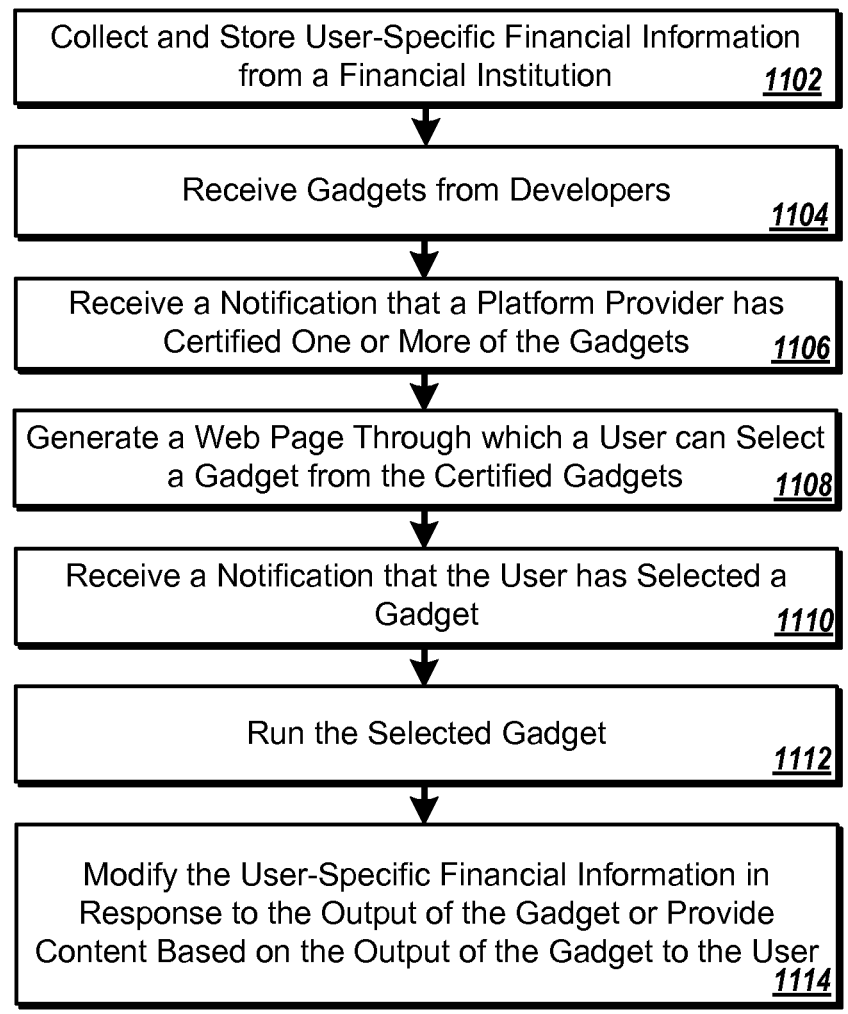
FIG. 11 is a flowchart of an example technique for providing gadgets to users.

FIG. 11 is a flowchart of an example technique 1100 for providing gadgets to users. For convenience, the example technique 1100 will be described in reference to a system that performs the technique 1100. The system can be, for example, the platform provider's server 402, or a financial institution's server 404.

The system collects and stores user-specific financial information from a financial institution (1102), for example, as described above with reference to FIG. 4. The system receives gadgets from developers (1104), for example, as described above with reference to FIG. 4. The system receives a notification that a platform provider has certified one or more of the gadgets (1106), for example, as described above with reference to FIG. 4. The system generates a web page through which a user can select a gadget from the certified gadgets (1108), for example, as described above with reference to FIGS. 4 and 7-9. The system receives a notification that the user has selected a gadget (1110), for example, as described above with reference to FIG. 4. The system runs the selected gadget, for example, as described above with reference to FIGS. 4-6. The system modifies the user-specific financial information in response to the output of the gadget or provides content based on the output of the gadget to the user (1114), for example, as described above with reference to FIGS. 4-6.

Figure 12:
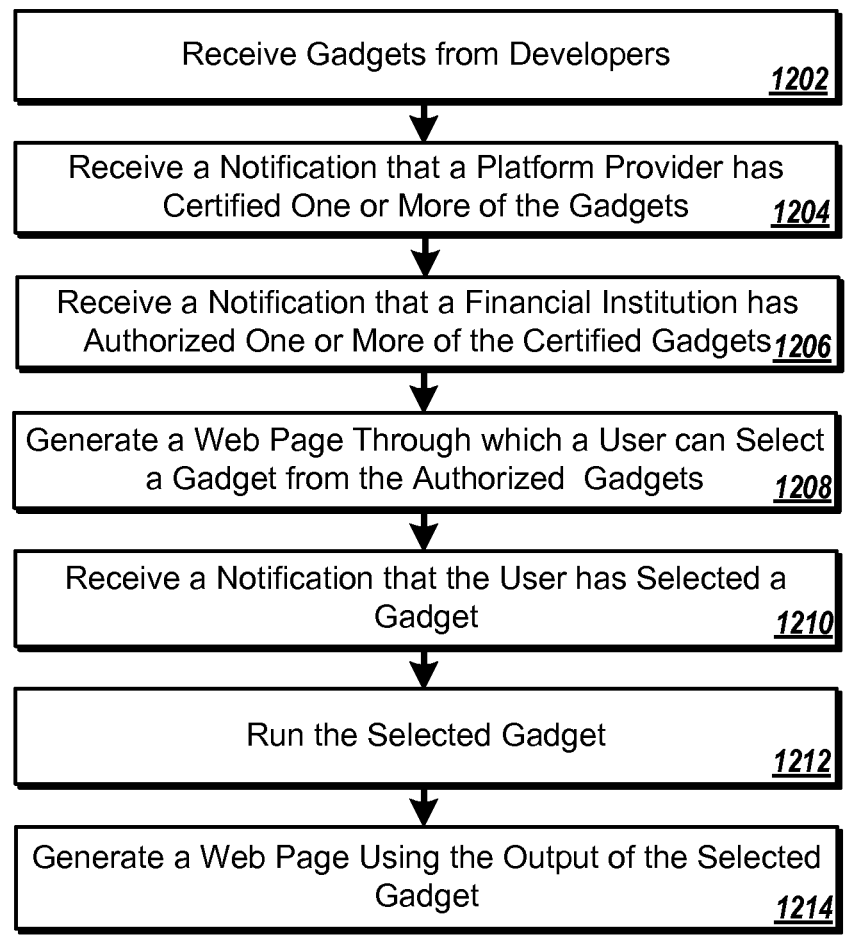
FIG. 12 is a flowchart of another example technique for providing gadgets to users.

FIG. 12 is a flowchart of another example technique 1200 for providing gadgets to users. For convenience, the example technique 1200 will be described in reference to a system that performs the technique 1200. The system can be, for example, the platform provider's server 402, or a financial institution's server 404.

The system receives gadgets from developers (1202), for example, as described above with reference to FIG. 4. The system receives a notification that a platform provider has certified one or more of the gadgets (1204), for example, as described above with reference to FIG. 4. The system receives a notification that a financial institution has authorized one or more of the certified gadgets (1206), for example, as described above with reference to FIG. 4. The system generates a web page through which a user can select a gadget from the authorized gadgets (1208), for example, as described above with reference to FIGS. 4 and 7-9. The system receives notification that the user has selected a gadget (1210), for example, as described above with reference to FIG. 4. The system runs the selected gadget (1212), for example, as described above with reference to FIG. 4. The system generates a web page using the output of the selected gadget (1214), for example, as described above with reference to FIGS. 4-6.

Figure 13:
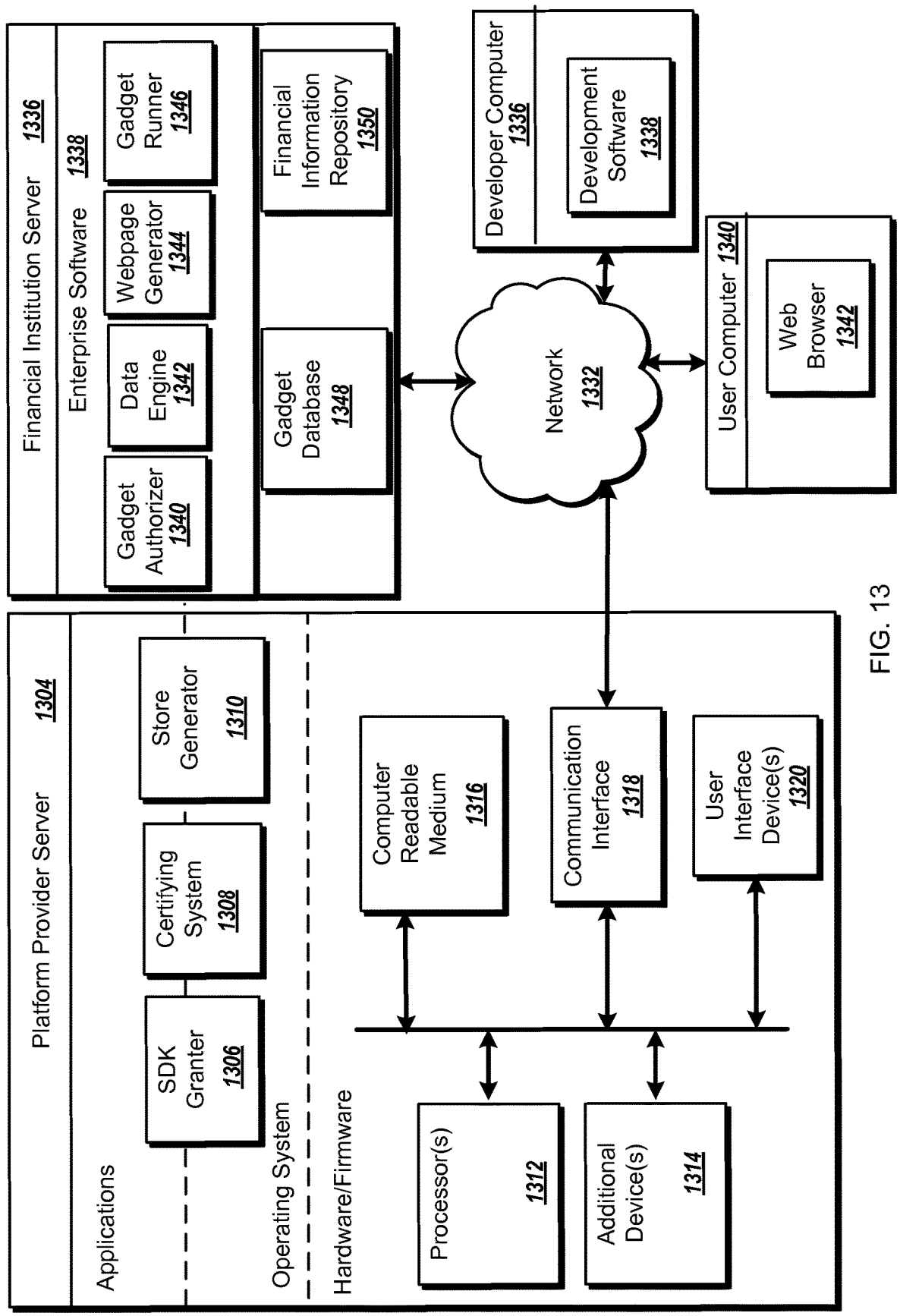
FIG. 13 is an example architecture of a second embodiment.

FIG. 13 illustrates an example architecture of a second embodiment. The second embodiment is much like the first embodiment except that the platform provider is a backend provider to the financial institution. The financial institution's server 1336 runs enterprise software 1338 provided by the platform provider. The enterprise software 1338 provides tools to, for example, collect financial information about a user's account with a financial institution, present the financial information to the user, and run gadgets. The enterprise software 1338 can run on hardware provided by the financial institution or hardware provided by the platform provider.

In the second embodiment, the gadget authorizer 1340, data engine 1342, web page generator 1344, and gadget runner 1346 are included in enterprise software 1338 run on the financial institution's server 1336.

In an alternative implementation, one or more of these computer programs is not part of the enterprise software 1338 but is a free standing application on the financial institution's server 1336. For example, the gadget authorizer 1340 could be a free-standing application on the financial institution's server 1336.

In some implementations, the data engine 1342 is run by the platform provider's server 1304 and accessed by the financial institution's server over the network 1332.

The financial institution's server 1336 also stores a gadget database 1348 and financial information repository 1350 that the enterprise software 1338 and computer programs on the financial institution's server 1336 can interact with. In an alternative implementation, one or both of the gadget database 1348 and the financial information repository 1350 are stored on the platform provider's server 1304 and accessed by the financial institution's server 1336 through the network.

Figure 14:
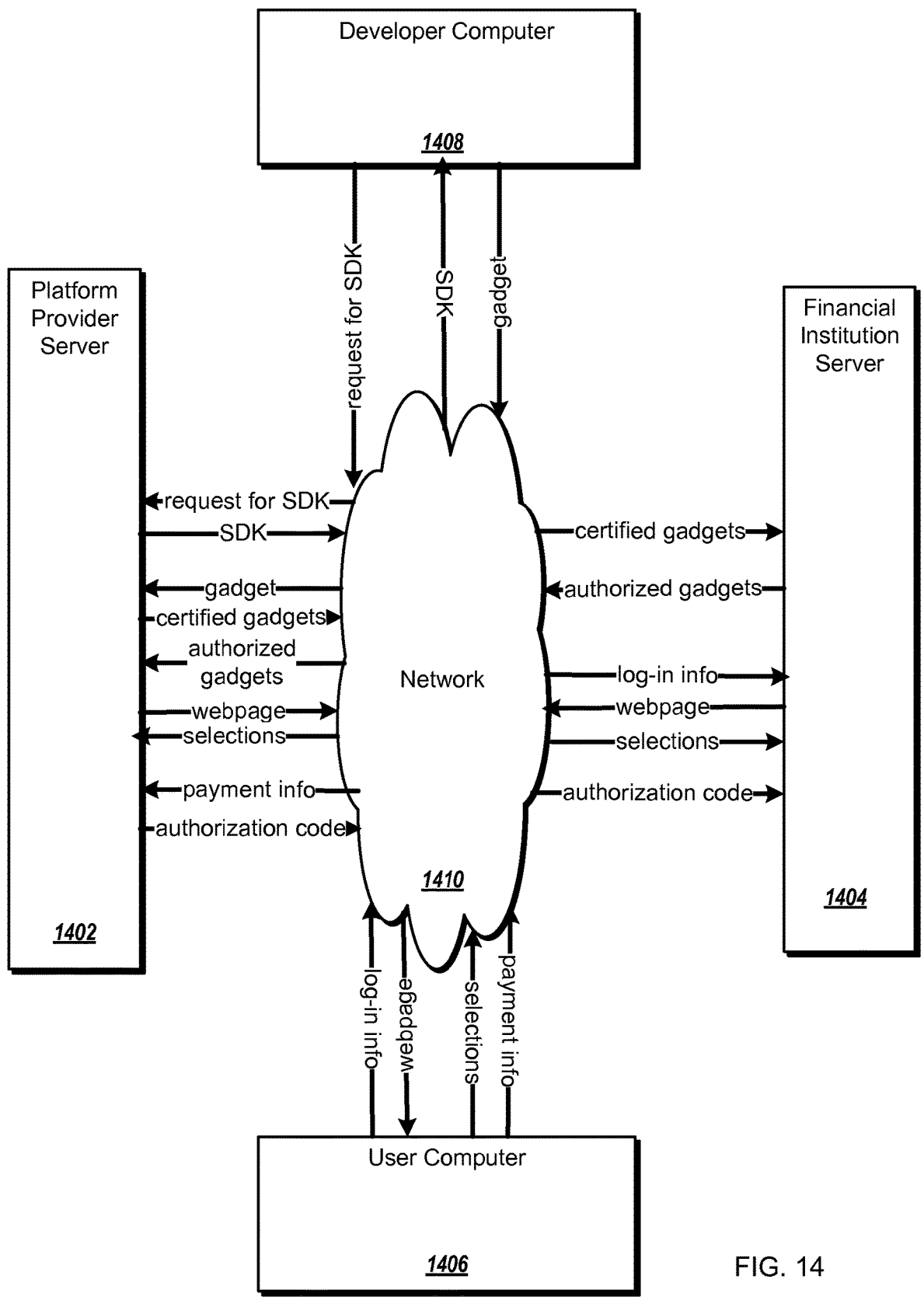
FIG. 14 illustrates an example information flow in a second embodiment.

FIG. 14 illustrates an example information flow in a second embodiment, in which a platform provider's server 1402, a financial institution's server 1404, a user's computer 1406, and a developer's computer 1408 are connected through a network 1410. While only one platform provider's server, one financial institution's server, one user's computer, and one developer's computer are illustrated here, each party can use multiple computers.

The information flow in the second embodiment is much like the information flow in the first embodiment, with a few exceptions.

A user interacts with the web pages generated by the financial institution's web page generator in this embodiment as he does with the web pages generated by the platform provider's web page generator in the first embodiment. In some implementations, the platform provider's server 1402 still generates web pages that make up the gadget store. In this implementation, both the platform provider's server 1402 and the financial institution's server 1404 send web pages to the user's computer 1406. Both the platform provider's server 1406 and the financial institution's server 1404 also receive selections from the user.

When the user's computer 1406 sends a notification to the financial institution's server 1404 indicating the user wants to run a gadget, the gadget runner on the financial institution's server 1404 verifies that the user has purchased the selected gadget by, for example, checking the data stored in the gadget database. In some implementations, the gadget runner calls and runs the gadget much as in the first embodiment. In some implementations, the user must have specifically purchased a gadget for use on the financial institution's server in order to be able to run the gadget. In this implementation, users who have purchased the gadget to run on the platform provider's server or on a different financial institution's server will not be able to run the gadget on the financial institution's server. When the gadget requests financial information, the data engine on the financial institution's server 1404 extracts any needed financial data from its collection of financial information and passes it to the gadget, much as the platform provider's data engine does in the first embodiment.

In some implementations, the data engine is run by the platform provider's server 1402. The financial institution's server 1404 sends a request for needed information to the platform provider's server 1402 over the network 1410. When the platform provider's server 1402 receives the request, it send the requested information to the financial institution's server 1404.

In some implementations, when a user's computer 1406 sends a request to access the gadget store to the financial institution's server 1404, the web page generated by the financial institution's server's web page generator links to the gadget store generated by the store generator on the platform provider's server. A user interacts with the store generated by the store generator as in the first embodiment, discussed above. The user's computer 1406 receives input from the user indicating the user wishes to make a purchase. The user's computer 1406 then sends a purchase notification to the platform provider's server 1402. The platform provider's sever 1402 then sends an authorization code to the financial institution's server 1404. The financial institution's server 1404 stores the authorization code for the user to run the gadget, for example, in its gadget database. The platform provider's server 1402 receives payment information from the user's computer 1406. The platform provider then collects and distributes the money as in the first embodiment.

In an alternative implementation, the gadget store is hosted by the financial institution's server 1404. In this implementation, the financial institution pays a fixed sum for each gadget it wants to sell in its store. This money is distributed by the platform provider to itself and the developer. When a user purchases a gadget from the financial institution's gadget store, the financial institution keeps the proceeds.

Figure 15:
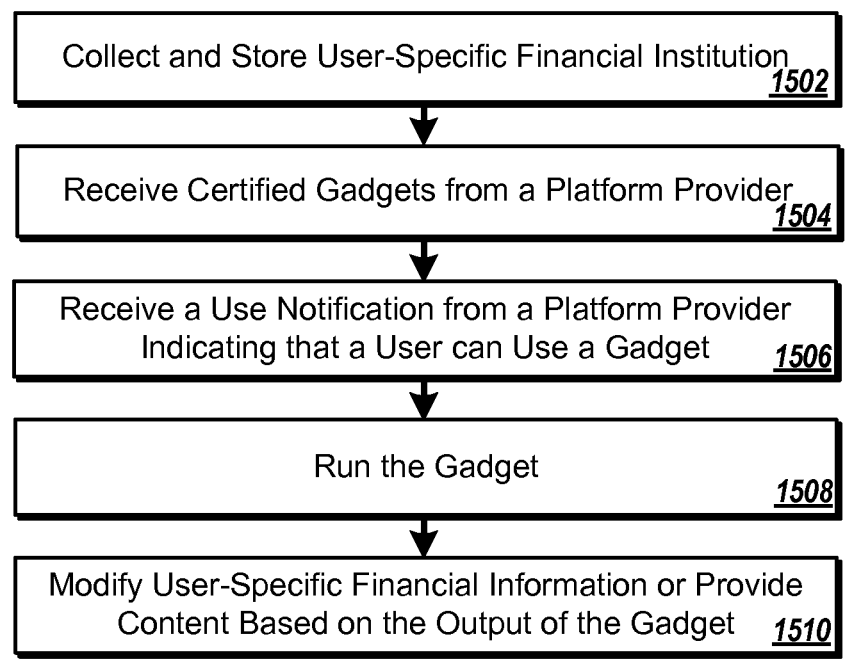
FIG. 15 is a flowchart of an example technique for providing gadgets to users.

FIG. 15 is a flowchart of another example technique 1500 for providing gadgets to users. For convenience, the example technique 1500 will be described in reference to a system that performs the technique 1500. The system can be, for example, a financial institution's server 404.

The system collects and stores user-specific financial information (1502), for example, as described above with reference to FIG. 4. The system receives certified gadgets from a platform provider (1504). For example, a platform provider's server can send data for the gadgets themselves, or data that links to where the gadgets are stored, to the system. The system then receives a use notification from a platform provider indicating that a user can use a gadget (1506). The use notification can be, for example, data retrieved by the system from a gadget database, for example, as described above with reference to FIG. 14. The system runs the gadget (1508), for example, as described comprising 1, for example, as described above with reference to FIGS. 4 and 14. The system modifies the user-specific financial information or provides content based on the output of the gadget (1510), for example, as described above with reference to FIGS. 4 and 14.

Figure 16:
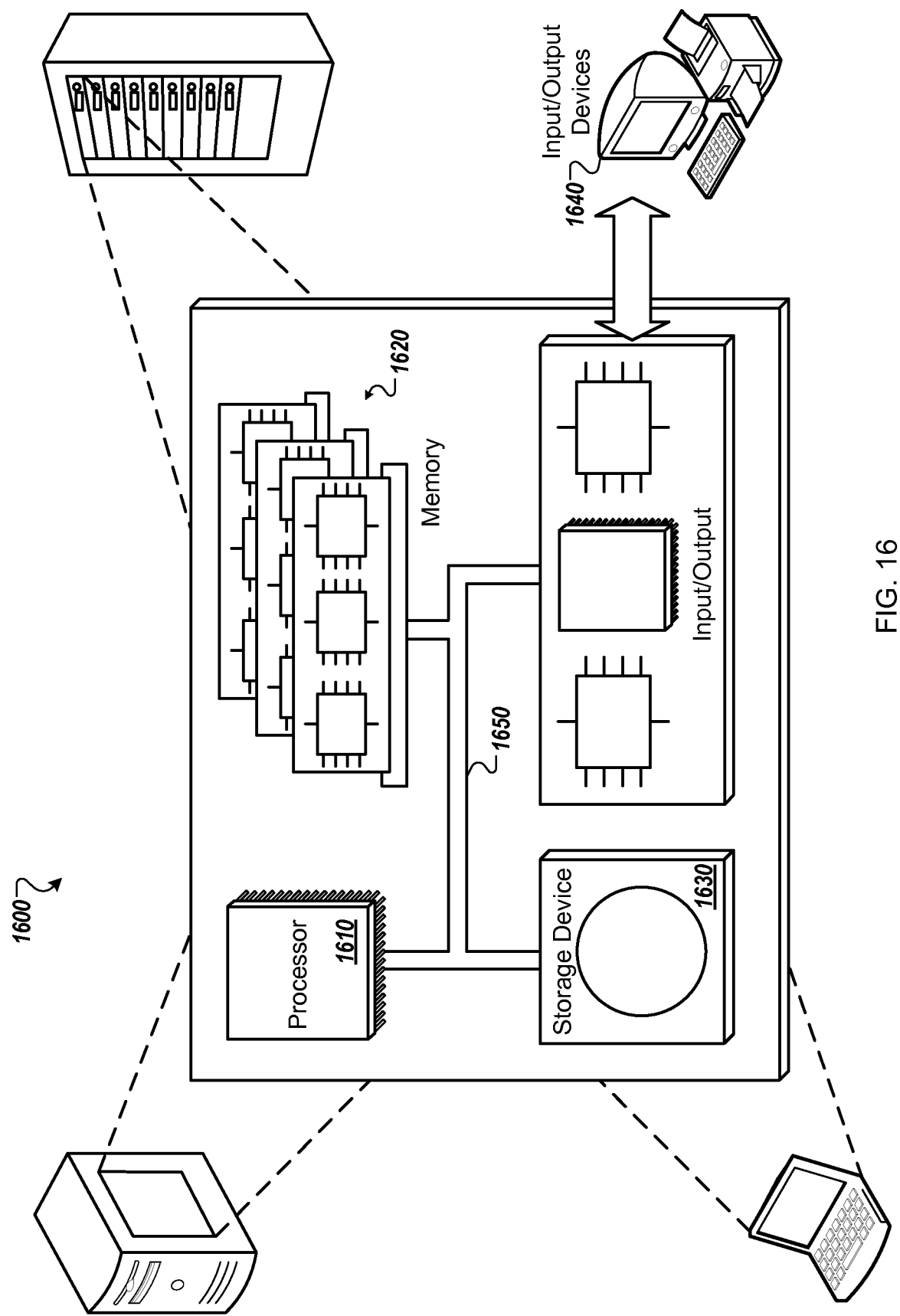
FIG. 16 is a schematic diagram of an example generic computer system.

FIG. 16 is a schematic diagram of an example of a generic computer system 1600. The system 1600 can be used for the operations described above according to FIG. 2 in one implementation. For example, the system 1600 may be included in either or all of the platform provider 202, developer 234, user 238, and the financial institution 244.

The system 1600 includes a processor 1610, a memory 1620, a storage device 1630, and an input/output device 1640. Each of the components 1610, 1620, 1630, and 1640 are interconnected using a system bus 1650. The processor 1610 is capable of processing instructions for execution within the system 1600. In some implementations, the processor 1610 is a single-threaded processor. In another implementation, the processor 1610 is a multi-threaded processor. The processor 1610 is capable of processing instructions stored in the memory 1620 or on the storage device 1630 to display graphical information for a user interface on the input/output device 1640.

The memory 1620 stores information within the system 1600. In some implementations, the memory 1620 is a computer-readable medium. In some implementations, the memory 1620 is a volatile memory unit. In another implementation, the memory 1620 is a non-volatile memory unit.

The storage device 1630 is capable of providing mass storage for the system 1600. In some implementations, the storage device 1630 is a computer-readable medium. In various different implementations, the storage device 1630 may be a floppy disk device, a hard disk device, an optical disk device, or a tape device.

The input/output device 1640 provides input/output operations for the system 1600. In some implementations, the input/output device 1640 includes a keyboard and/or pointing device. In another implementation, the input/output device 1640 includes a display unit for displaying graphical user interfaces.

The features described above can be implemented in digital electronic circuitry, integrated circuitry, specially designed ASICs (application specific integrated circuits), computer hardware, firmware, software, and/or combinations thereof. Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used in this specification, the terms "machine-readable medium" or "computer-readable medium" refers to any computer program product, apparatus and/or device (e.g., magnetic discs, optical disks, memory, Programmable Logic Devices (PLDs)) used to provide machine instructions and/or data to a programmable processor. In some implementations, the machine-readable medium receives machine instructions as a machine-readable signal. The term "machine-readable signal" refers to any signal used to provide machine instructions and/or data to a programmable processor.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data, including databases, include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, the developer 103 and the platform provider 102 may be implemented within the same computer system.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method, comprising:

collecting, in a server computer system, user-specific financial information from a computer system of a financial institution, the user-specific financial information associated with an account of a user at the financial institution;

storing the user-specific financial information in the server computer system;

receiving in the server computer system a plurality of gadgets from at least one computer system of a plurality of developers other than the server computer system and the computer system of the financial institution, wherein each gadget is configured to request user-specific financial information associated with a user of the server computer system and determines a respective output based on the user-specific financial information and a respective functionality of the gadget;

storing, in the server computer system, respective indications of certifications of one or more of the plurality of gadgets;

storing, in the server computer system, indications of rights of the user to run an initial set of gadgets from the plurality of gadgets;

generating a first web page with the server computer system and providing the first web page to a client computer of the user, the first web page including a first portion displaying at least some of the user-specific financial information and a second portion displaying the respective output of the initial set of gadgets;

generating a second web page with the server computer system and providing the second web page to the client computer of the user, the second web page including a user interface through which the user can select one or more gadgets from the one or more certified gadgets;

receiving in the server computer system a notification from the client computer that the user has selected a gadget from the one or more certified gadgets that are not included in the initial set of gadgets, wherein selecting the gadget includes updating rights of the user to run the selected gadget on the server computer system and updating indications of rights of the user to run an updated set of gadgets that includes the selected gadget;

updating a set of gadgets that display in the second portion to include the initial set of gadgets and the selected gadget;

calling the selected gadget from the server computer system, including providing the user-specific financial information to the selected gadget and receiving output from the selected gadget, wherein the selected gadget runs on the server computer system;

modifying the user-specific financial information in the server computer system in response to the output of the selected gadget or providing user-specific financial information based on the output of the selected gadget to the client computer of the user; and generating a third web page with the server computer system and providing the third web page to the client computer of the user, the third web page including the first portion displaying at least some of the user-specific financial information and the second portion displaying the respective output of the updated set of gadgets.

2. The method of claim 1, further comprising:
receiving in the server computer system an indication that the financial institution has authorized one or more of the certified gadgets; and
wherein the user interface allows a user to select a gadget only from the one or more authorized gadgets.

3. The method of claim 1, wherein selecting a gadget is purchasing a gadget, the method further comprising:
receiving in the server computer system payment information associated with the purchase of the gadget, where payment information includes an amount owed and a payment source; and
receiving a notification in the server computer system that an electronic payment equal to the amount owed has been received from the payment source.

4. The method of claim 3, further comprising:
causing electronic payments to be made to the financial institution and the one or more developers associated with the gadget.

5. The method of claim 1, further comprising:
storing the one or more certified gadgets in the server computer system.

6. The method of claim 1, wherein the server computer system determines whether to certify each of the plurality gadgets according to whether the gadget performs its advertised functionality, whether there are any security concerns about the gadget, and whether there are any performance concerns about the gadget.

7. The method of claim 1, wherein calling the selected gadget from the server computer system comprises running the selected gadget on the server computer system.

8. A non-transitory computer storage medium encoded with a computer program, comprising:
a computer-readable article of manufacture, the computer-readable article of manufacture encoded with instructions that when executed by a server computer system cause the server computer system to perform operations comprising:

collecting user-specific financial information from a computer system of a financial institution, the user-specific financial information associated with an account of a user at the financial institution;

storing the user-specific financial information;

receiving a plurality of gadgets from at least one computer system of a plurality of developers other than the server computer system and the computer system of the financial institution, wherein each gadget is configured to request user-specific financial information associated with a user of the server computer system and determines a respective output based on the user-specific financial information and a respective functionality of the gadget;

storing respective indications of certifications of one or more of the plurality of gadgets;

storing indications of rights of the user to run an initial set of gadgets from the plurality of gadgets;

generating a first web page and providing the first web page to a client computer of the user, the first web page including a first portion displaying at least some of the user-specific financial information and a second portion displaying the respective output of the initial set of gadgets;

generating a second web page and providing the second web page to the client computer of the user, the second web page including a user interface through which the user can select one or more gadgets from the one or more certified gadgets;

receiving a notification from the client computer that the user has selected a gadget from the one or more certified gadgets that are not included in the initial set of gadgets, wherein selecting the gadget includes updating rights of the user to run the selected gadget on the server computer system and updating indications of rights of the user to run an updated set of gadgets that includes the selected gadget;

updating a set of gadgets that display in the second portion to include the initial set of gadgets and the selected gadget;

calling the selected gadget, including providing the user-specific financial information to the selected gadget and receiving output from the selected gadget, wherein the selected gadget runs on the server computer system;

modifying the user-specific financial information in response to the output of the gadget or providing user-specific financial information based on the output of the gadget to the user; and generating a third web page and providing the third web page to the client computer of the user, the third web page including the first portion displaying at least some of the user-specific financial information and the second portion displaying the respective output of the updated set of gadgets.

9. The computer storage medium of claim 8, encoded with instructions that when executed by the server computer system cause the server computer system to perform operations comprising:
receiving an indication that the financial institution has authorized one or more of the certified gadgets; and
wherein the user interface allows a user to select a gadget only from the one or more authorized gadgets.

10. The computer storage medium of claim 8, encoded with instructions that when executed by the server computer system cause the server computer system to perform operations comprising:

receiving payment information associated with the purchase of the gadget, where payment information includes an amount owed and a payment source; and receiving a notification that an electronic payment equal to the amount owed has been received from the payment source.

11. The computer storage medium of claim 10, encoded with instructions that when executed by the server computer system cause the server computer system to perform operations comprising:

causing electronic payments to be made to the financial institution and the one or more developers associated with the gadget.

12. The computer storage medium of claim 8, encoded with instructions that when executed by the server computer system cause the server computer system to perform operations comprising:

storing the one or more certified gadgets.

13. The computer storage medium of claim 8, wherein calling the selected gadget from the server computer system comprises running the selected gadget on the server computer system.

* * * * *